US010115218B2

(12) United States Patent
Hisada et al.

(10) Patent No.: US 10,115,218 B2
(45) Date of Patent: Oct. 30, 2018

(54) VEHICULAR DISPLAY DEVICE

(71) Applicant: MAZDA MOTOR CORPORATION, Hiroshima (JP)

(72) Inventors: Seiji Hisada, Higashihiroshima (JP); Shigeyuki Sato, Aki-gun (JP); Hado Morokawa, Hiroshima (JP); Yo Kitamura, Hiroshima (JP); Hidehiko Soda, Hatsukaichi (JP); Tatsuya Shimmura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 64 days.

(21) Appl. No.: 15/513,932

(22) PCT Filed: Aug. 9, 2016

(86) PCT No.: PCT/JP2016/073410
§ 371 (c)(1),
(2) Date: Mar. 23, 2017

(87) PCT Pub. No.: WO2017/030044
PCT Pub. Date: Feb. 23, 2017

(65) Prior Publication Data
US 2017/0287193 A1 Oct. 5, 2017

(30) Foreign Application Priority Data

Aug. 20, 2015 (JP) .................................. 2015-162574
Aug. 20, 2015 (JP) .................................. 2015-162575

(51) Int. Cl.
*G06T 13/00* (2011.01)
*B60K 35/00* (2006.01)
(Continued)

(52) U.S. Cl.
CPC .............. *G06T 13/00* (2013.01); *B60K 35/00* (2013.01); *G09G 5/00* (2013.01); *G09G 5/36* (2013.01);
(Continued)

(58) Field of Classification Search
CPC ......... G06T 13/40; G06T 13/00; G06T 13/80; G06T 13/20; A63F 13/10
See application file for complete search history.

(56) References Cited

U.S. PATENT DOCUMENTS

2013/0127608 A1* 5/2013 Ishikawa ................ B60K 37/02
340/425.5
2013/0307757 A1* 11/2013 Yasumoto ................ G09G 3/36
345/32

FOREIGN PATENT DOCUMENTS

JP      2010-228471 A    10/2010
JP      2013-024948 A     2/2013
(Continued)

OTHER PUBLICATIONS

International Search Report issued in PCT/JP2016/073410; dated Sep. 6, 2016.
(Continued)

*Primary Examiner* — Todd Buttram
(74) *Attorney, Agent, or Firm* — Studebaker & Brackett PC

(57) ABSTRACT

A vehicular display device mounted on a vehicle, including: a display panel; a display controller that displays an opening animation image in a predetermined display region of the display panel; and a detector that detects a getting-in action associated with an occupant getting in the vehicle, wherein the display controller displays a checklist in the predetermined display region as information relating to the vehicle after a driving source for traveling of the vehicle is started, the display controller starts a display operation of displaying
(Continued)

the opening animation image in the display region when the getting-in action is detected by the detector, and continues the display operation at least until the checklist is displayed, and the display controller displays, as the opening animation image, an animation image in which an image display operation of changing a display form of a graphic object is periodically repeated, on the display panel.

8 Claims, 19 Drawing Sheets

(51) Int. Cl.
  *G09G 5/00* (2006.01)
  *G09G 5/36* (2006.01)
(52) U.S. Cl.
  CPC   *B60K 2350/1056* (2013.01); *B60K 2350/352* (2013.01); *H05K 999/99* (2013.01)

(56) References Cited

FOREIGN PATENT DOCUMENTS

| | | |
|---|---|---|
| JP | 2013-108841 A | 6/2013 |
| JP | 2013-238817 A | 11/2013 |
| JP | 2014-157087 A | 8/2014 |

OTHER PUBLICATIONS

JP Office Action dated Sep. 12, 2017, from corresponding JP Appl No. 2015-162575, with English translation, 9 pp.

* cited by examiner

VEHICULAR DISPLAY DEVICE

TECHNICAL FIELD

The present invention relates to a vehicular display device.

BACKGROUND ART

Conventionally, a vehicular display device including a meter unit capable of displaying graphics such as a liquid crystal display panel is known. For example, in a display device disclosed in Patent Literature 1, when a user turns an ignition switch on to start an engine in order to start driving a vehicle, a display element is displayed vaguely in a central portion of a meter such as a speedometer, and then, a pointer of the meter is displayed. In this way, the user is prompted to look at the meter and the user experiences an innovative impression with varied display content.

CITATION LIST

Patent Literature

Patent Literature 1: Japanese Unexamined Patent Publication No. 2014-157087

SUMMARY OF INVENTION

When an occupant starts driving a vehicle being parked, the occupant executes a getting-in action associated with getting into the vehicle such as unlocking of a door lock, opening of a door, or getting into a vehicle. In this case, the engine may not be started immediately after the getting-in action is executed. However, Patent Literature 1 makes no description relating to display until the engine is started after an occupant executes the getting-in action. Regarding the display, further improvement in displaying information until the engine is started after the occupant executes the getting-in action is required.

An object of the present invention is to provide a vehicular display device capable of displaying appropriate information until an engine is started after an occupant executes a getting-in action.

An aspect of the present invention is a vehicular display device mounted on a vehicle, including: a display panel that displays information relating to the vehicle; a display controller that displays an opening animation image in a predetermined display region of the display panel; and a detector that detects a getting-in action associated with an occupant getting in the vehicle, wherein the display controller displays a checklist indicating a checking result of a state of each unit of the vehicle in the predetermined display region as the information relating to the vehicle after a driving source for traveling of the vehicle is started, the display controller starts a display operation of displaying the opening animation image in the display region of the display panel when the getting-in action is detected by the detector, and continues the display operation at least until the checklist is displayed, and the display controller displays, as the opening animation image, an animation image, in which an image display operation of changing a display form of a graphic object is periodically repeated, on the display panel.

According to the present invention, the attention of the occupant can be attracted to the predetermined display region of the display panel when the occupant gets into the vehicle. Therefore, when the checklist is displayed on the predetermined display region of the display panel as the information relating to the vehicle, the occupant can better understand the checking result.

DESCRIPTION OF EMBODIMENTS

[Overall Configuration]

Figure 1:
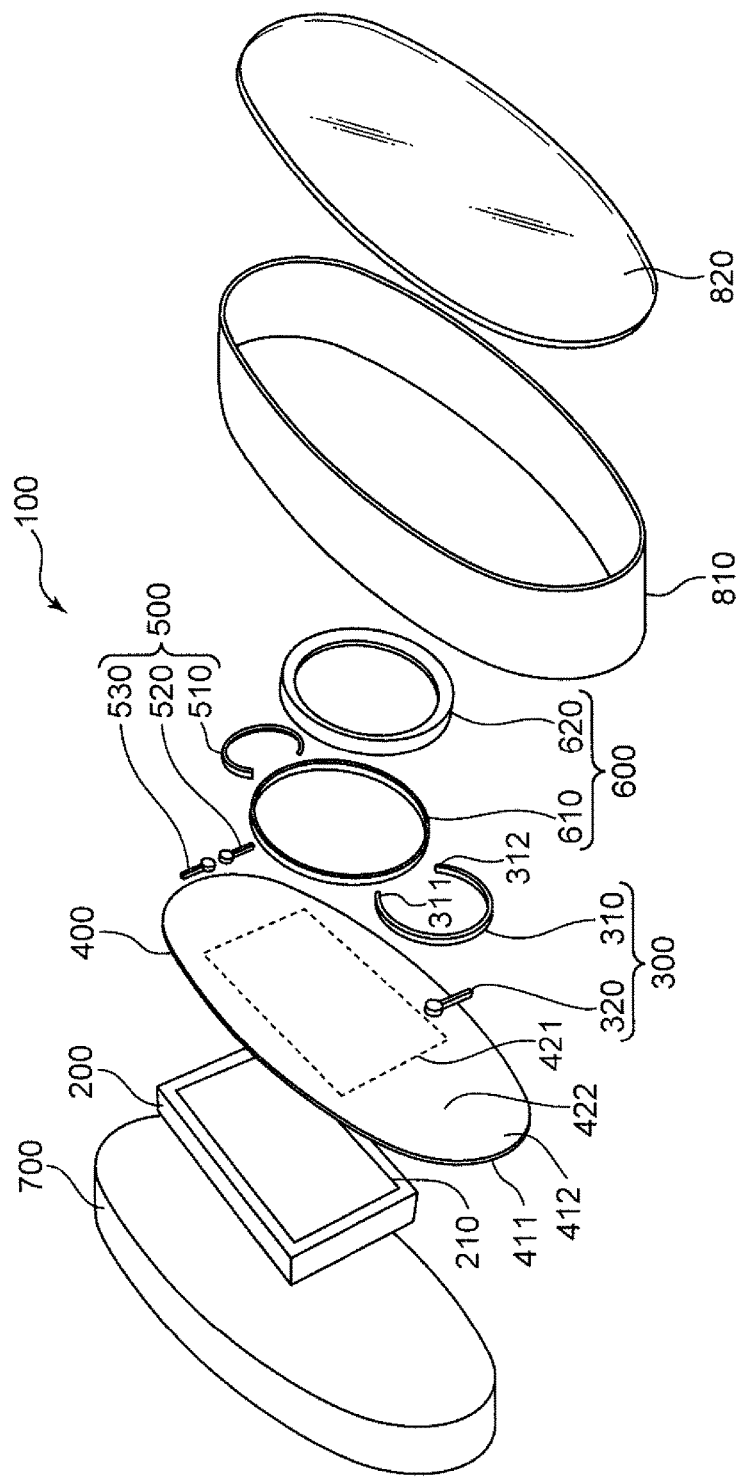
FIG. 1 is a schematic exploded perspective view of a vehicular display device.

FIG. 1 is a schematic exploded perspective view of a display device (hereinafter referred to as a display device 100) installed in a vehicle. The display device 100 will be described with reference to FIG. 1.

The display device 100 includes a display panel 200 and analog meters 300 and 500. The display panel 200 includes a display surface 210. The display panel 200 displays an image on the display surface 210. The display panel 200 may be a liquid crystal display that drives liquid crystals to display an image. Alternatively, the display panel 200 may be a plasma display which uses plasma emission. Further alternatively, the display panel 200 may be an organic electroluminescence (EL) display which uses an organic EL element. The principle of the present embodiment is not limited to a specific type of the display panel 200.

The image may contain information relating to a vehicle on which the display device 100 is mounted. As an example of the information relating to a vehicle, at least one of vehicle state information indicating the state of a vehicle, travel information relating to a traveling state of a vehicle, and environment information relating to an environment in which a vehicle travels can be employed. As an example of the state information, information indicating a residual fuel amount, the water temperature in a radiator, a lighting state of a headlight, and the like can be employed. As an example of the traveling information, a traveling speed of a vehicle, an engine speed, and the like can be employed. As an example of the environment information, a legal speed limit determined for a road on which a vehicle travels and information relating to the outside temperature or weather can be employed.

Similarly to analog meters mounted on existing vehicles, the analog meters 300 and 500 may provide information (for example, a vehicle speed, an engine speed, a water temperature in a radiator, and a residual fuel amount) relating to the vehicle on which the display device 100 is mounted to the driver.

The analog meter 300 is disposed on the left side of the display panel 200 and includes a C-shaped ring 310 and a pointing needle 320.

The pointing needle 320 rotates within a region surrounded by the C-shaped ring 310. Indexes (for example, scale marks and numbers) indicating physical amounts related to the traveling state of the vehicle on which the display device 100 is mounted are displayed in the region surrounded by the C-shaped ring 310. Presentation of indexes may follow various methods used in analog meters mounted on existing vehicles.

The analog meter 500 is disposed on the right side of the display panel 200, and similarly to the analog meter 300, provides information (for example, a vehicle speed, an engine speed, a water temperature in a radiator, and a residual fuel amount) indicating the traveling state of the vehicle on which the display device 100 is mounted to the driver, the information being different from that displayed in the analog meter 300.

The analog meter 500 includes a C-shaped ring 510 and pointing needles 520 and 530.

The pointing needles 520 and 530 rotate within a region surrounded by the C-shaped ring 510. In a region surrounded by the C-shaped ring 510, indexes (for example, scale marks and numbers) indicating the physical amounts related to the traveling state of the vehicle on which the display device 100 is mounted may be drawn on a display board 400.

The display device 100 further includes the display board 400. The display board 400 is disposed between the display panel 200 and the analog meters 300 and 500. The display board 400 includes a flat first surface 411 and a flat second surface 412. The first surface 411 faces the display panel 200. The analog meters 300 and 500 are attached to the second surface 412 on the opposite side of the first surface 411.

A display region 421 having a size and a shape approximately identical to those of the display surface 210 of the display panel 200 and a peripheral region 422 which is a region outside the display region 421 are provided in the display board 400.

The display region 421 may have optically higher transmittance than the peripheral region 422, for example. Video light emitted from the display surface 210 of the display panel 200 propagates from the first surface 411 to the second surface 412. After that, the video light is emitted from the display region 421 of the second surface 412.

The display device 100 further includes a ring-shaped member 600. The ring-shaped member 600 includes a ring member 610 and a translucent ring 620. The translucent ring 620 is disposed in the ring member 610. The translucent ring 620 contributes to giving a stereoscopic visual impression to the driver in cooperation with the ring member 610.

The display device 100 further includes a driving unit 700, a meter bezel 810, and a protective board 820. The pointing needle 320 of the analog meter 300 and the pointing needles 520 and 530 of the analog meter 500 are mechanically connected to the driving unit 700 with the display board 400 interposed.

The driving unit 700 rotates the pointing needles 320, 520, and 530. Various techniques used in the existing vehicles may be used for the connection between the driving unit 700 and the pointing needles 320, 520, and 530. Therefore, the principle of the present embodiment is not limited to a specific connection technique between the driving unit 700 and the pointing needles 320, 520, and 530.

The driving unit 700 may include a display controller 730 (see FIG. 4 to be described later) that generates an image signal for driving the display panel 200. The image signal is output from the driving unit 700 to the display panel 200. The display panel 200 may display a meter image according to the image signal.

The driving unit 700 may include driving motors 721, 722, and 723 (see FIG. 4 to be described later) that drive the pointing needles 320, 520, and 530. The driving unit 700 may include various electric circuits, driving devices, and optical devices for operating the display device 100. The principle of the present embodiment is not limited to a specific structure of the driving unit 700.

The meter bezel 810 is a cylinder that defines a space in which the display panel 200, the ring-shaped member 600, the analog meter 300, the analog meter 500, the display board 400, and the driving unit 700 are accommodated. The protective board 820 closes an opening of the meter bezel 810. The display panel 200, the ring-shaped member 600, the analog meters 300 and 500, and the display board 400 are disposed between the driving unit 700 and the protective board 820 in the meter bezel 810.

The protective board 820 is generally transparent. Therefore, video light generated by the display panel 200 can reach the protective board 820 through the display board 400, and after that, can enter the eyes of the driver. An optical treatment for suppressing reflection may be performed on the protective board 820. In this case, the driver visually perceives an image projected by the display panel 200 satisfactorily without being disturbed by the reflection on the protective board 820.

Figure 2:
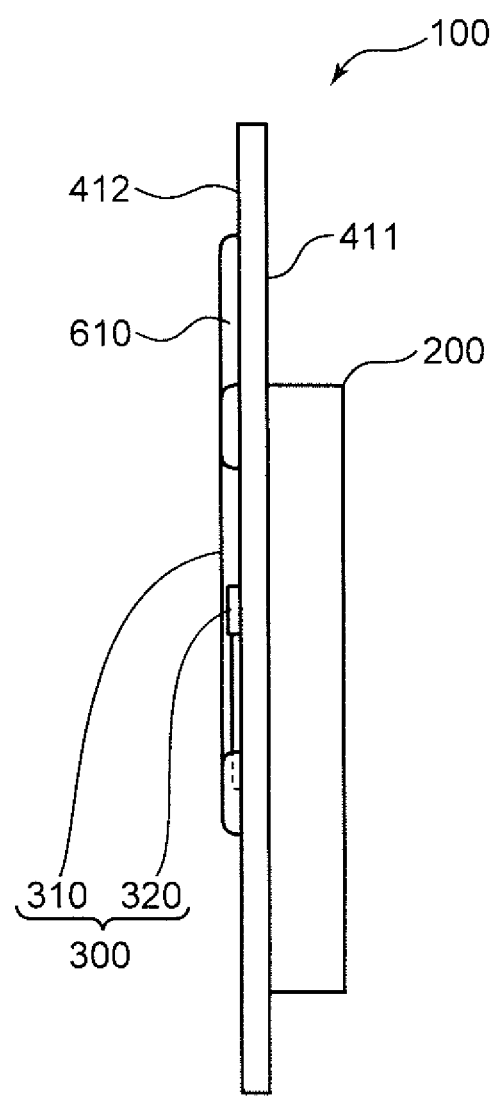
FIG. 2 is a schematic side view of the display device.

FIG. 2 is a schematic side view of the display device 100.

As illustrated in FIG. 2, the display panel 200 may be in close contact with the first surface 411. Alternatively, a very small gap may be formed between the display panel 200 and the first surface 411. Since the display panel 200 is very close to the first surface 411, the driver can easily perceive that the image displayed by the display panel 200 is projected on the display region 421 of the second surface 412 from which video light is emitted.

Since the driver perceives that the analog meters 300 and 500 are attached to the second surface 412 to which an image is projected, the display device 100 can maintain visual integrity between the analog meters 300, 500 and the display panel 200.

[Screen Configuration]

Figure 3:
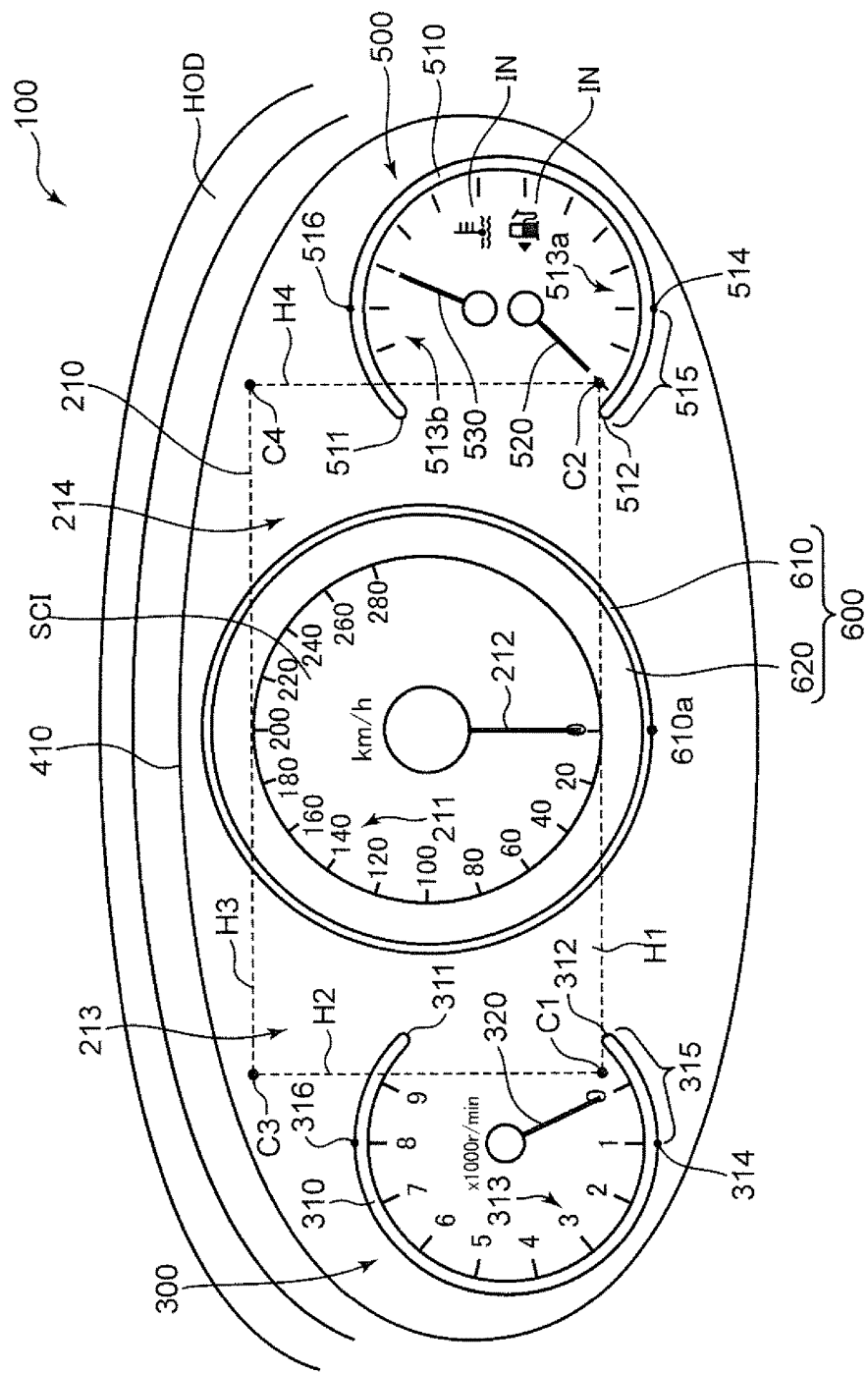
FIG. 3 is a diagram illustrating an example of a configuration of the display device.

FIG. 3 is a diagram illustrating an example of a configuration of the display device 100. The display device 100 has a display board region 410 which is partitioned by the display board 400 and has a horizontally long oval shape. The display device 100 is attached so that the display board region 410 is positioned in a dashboard of the vehicle. Specifically, the display board region 410 is attached to a lower portion of a hood HOD that protrudes so as to block external light entering from a windshield.

The display surface 210 of the display panel 200 is disposed in a central portion of the display board region 410. The display surface 210 has a horizontally long rectangular shape. The ring-shaped member 600 is attached so that the center thereof is positioned at the center of the display surface 210, for example.

The display surface 210 displays a meter image SCI (an example of the ring-type analog meter) in the ring-shaped member 600. In the example of FIG. 3, an image of a speedometer indicating a traveling speed of the vehicle is employed as the meter image SCI. The ring-shaped member 600 includes the circular ring member 610 and the translucent ring 620 in a donut shape attached along an inner circumference of the ring member 610.

The meter image SCI is displayed on the display surface 210 so as to fit into the translucent ring 620 and includes an index image 211 and a pointing needle image 212. The index image 211 includes a plurality of scale marks which are disposed at an equal interval in a radial form so as to indicate the traveling speed. In the example of FIG. 3, a scale mark indicating the traveling speed "0" is disposed in the lowermost portion of the meter image SCI, and fifteen scale marks indicating a traveling speed range between the traveling speed "0" and the traveling speed "280" at intervals of 20 km/h are arranged so as to surround the center of the meter image SCI. Moreover, the index image 211 includes fifteen number images illustrating the traveling speeds corresponding to the fifteen scale marks. The pointing needle image 212 rotates about the meter image SCI and has a needle shape that extends in a radial direction of the meter image SCI. The pointing needle image 212 is displayed while rotating in the range between the traveling speed "0" and the traveling speed "280".

In the example of FIG. 3, the scale marks are included in the meter image SCI but may be disposed in the translucent ring 620.

The analog meter 300 is disposed on the left side of the display surface 210, and the analog meter 500 is disposed on the right side of the display surface 210.

The analog meter 300 includes the C-shaped ring 310 having a circular arc shape that defines an outer edge of the analog meter 300, and the analog meter 500 includes the C-shaped ring 510 having a circular arc shape that defines an outer edge of the analog meter 500. The C-shaped rings 310 and 510 have the same size and shape, and are disposed at an equal distance in a horizontal direction from the center of the ring member 610. Moreover, the C-shaped ring 310 is disposed so that an upper end 311 and a lower end 312 face the ring member 610, and the C-shaped ring 510 is disposed so that an upper end 511 and a lower end 512 face the ring member 610. In this way, the analog meters 300 and 500 are disposed linearly symmetrical about the center of the ring member 610.

The analog meter 300 has an index portion 313 disposed along an inner circumference of the C-shaped ring 310. The index portion 313 includes a plurality of scale marks disposed radially along the inner circumference of the C-shaped ring 310 and numbers corresponding to the scale marks. In FIG. 3, a tachometer indicating the engine speed is employed as the analog meter 300. Therefore, numbers "0" to "9" indicating an engine speed range between 0000 rpm and 9000 rpm at intervals of 1000 rpm and ten scale marks corresponding to the numbers are disposed in the index portion 313 at an equal interval along approximately the entire inner circumference of the C-shaped ring 310. In the example of FIG. 3, a smallest scale mark corresponding to the number "0" is disposed close to the lower end 312, and a highest scale mark corresponding to the number "9" is disposed close to the upper end 311.

The pointing needle 320 is configured as a needle-shaped member that rotates about the center of the analog meter 300 and extends linearly in the radial direction of the C-shaped ring 310. The pointing needle 320 rotates in the range between the scale mark of the number "0" and the scale mark of the number "9".

The analog meter 500 includes two meters which are disposed on the upper and lower sides and which share the C-shaped ring 510. In the example of FIG. 3, a temperature meter is employed as the upper meter and a fuel meter is employed as the lower meter.

The analog meter 500 includes an index portion 513a of a fuel meter and an index portion 513b of a temperature meter disposed along the inner circumference of the C-shaped ring 510. The index portion 513a includes a plurality of scale marks disposed radially at an equal interval along the inner circumference of the lower half portion of the C-shaped ring 510. The index portion 513b includes a plurality of scale marks disposed radially at an equal interval along the inner circumference of the upper half portion of the C-shaped ring 510. The index portion 513b has a scale mark indicating the lowest temperature disposed slightly above the center in the vertical direction of the C-shaped ring 510 and a scale mark indicating the highest temperature disposed close to the upper end 511. Moreover, the index portion 513a has a scale mark indicating the full state of fuel disposed slightly below the center in the vertical direction of the C-shaped ring 510 and a scale mark indicating the empty state of fuel disposed close to the lower end 512.

In the analog meter 500, an indicator IN indicating that the upper meter is a temperature meter is disposed on the right side of the pointing needle 530, and an indicator IN indicating that the lower meter is a fuel meter is disposed on the right side of the pointing needle 520.

The pointing needle 520 is configured as a needle-shaped member that rotates about a side slightly below the center of the analog meter 300 and extends linearly in the radial direction of the C-shaped ring 510. The pointing needle 520 rotates in the range between a scale mark indicating the empty state of fuel and a scale mark indicating the full state of fuel.

The pointing needle 530 is configured as a needle-shaped member that rotates about a side slightly above the center of the analog meter 300 and extends linearly in the radial direction of the C-shaped ring 510. The pointing needle 530 rotates in the range between a scale mark indicating a lowest temperature and a scale mark indicating a highest temperature.

The C-shaped ring 310 has a circular arc shape that is larger than a semi-circle and runs around a bottom-left corner C1 of the display surface 210. The upper end 311 of the C-shaped ring 310 enters into the display surface 210 from the left edge H2 of the display surface 210, so that the C-shaped ring 310 is disposed close to the left edge 112. The lower end 312 of the C-shaped ring 310 comes into contact with the lower edge H1 of the display surface 210, so that the C-shaped ring 310 is disposed close to the lower edge H1.

The C-shaped ring 510 has a circular arc shape that is larger than a semi-circle and runs around a bottom-right corner C2 of the display surface 210. The upper end 511 of the C-shaped ring 510 enters into the display surface 210 from the right edge H4 of the display surface 210, so that the C-shaped ring 510 is disposed close to the right edge H4. The lower end 512 of the C-shaped ring 510 comes into contact with the lower edge H1 of the display surface 210, so that the C-shaped ring 510 is disposed close to the lower edge H1.

That is, the C-shaped rings 310 and 510 run around toward the lower edge H1 from the lower side of the display surface 210. In this way, it is possible to secure the region of the analog meters 300 and 500 without increasing the horizontal width of the display device 100.

The index portions 313 and 513a are disposed along the inner circumferences of the C-shaped rings 310 and 510 so as to run around the corners C1 and C2, respectively. Specifically, the index portion 313 extends to a run-around region 315 which extends from a lowermost portion 314 of the C-shaped ring 310 to the lower end 312 of the C-shaped ring 310. Moreover, the index portion 513a extends to a run-around region 515 which extends from a lowermost portion 514 of the C-shaped ring 510 to the lower end 512 of the C-shaped ring 310. In this way, it is possible to increase the region of the index portions 313, 513a, and to secure a sufficiently large interval between scale marks.

An upper edge H3 of the display surface 210 is positioned above uppermost portions 316 and 516 of the C-shaped rings 310 and 510. Moreover, the ring-shaped member 600 has a larger diameter than the C-shaped rings 310 and 510, and a lowermost portion 610a is positioned below the lower edge H1 of the display surface 210. Due to this, it is possible to secure a sufficiently larger region of the ring-shaped member and to improve the visibility of the meter image SCI displayed on the inner side of the ring-shaped member 600.

Furthermore, the lowermost portions 314 and 514 of the C-shaped rings 310 and 510 and the lowermost portion 610a of the ring-shaped member 600 are at the same height position. In this way, the lower ends of the analog meters 300 and 500 and the ring-shaped member 600 are uniform, and the aesthetic impression of the entire display device 100 can be enhanced.

In the display surface 210, display regions 213 and 214 capable of displaying images are set in regions on the outer sides of the ring-shaped member 600. The display region 213 is disposed on the left side of the ring-shaped member 600 and the display region 214 is disposed on the right side of the ring-shaped member 600.

Figure 4:
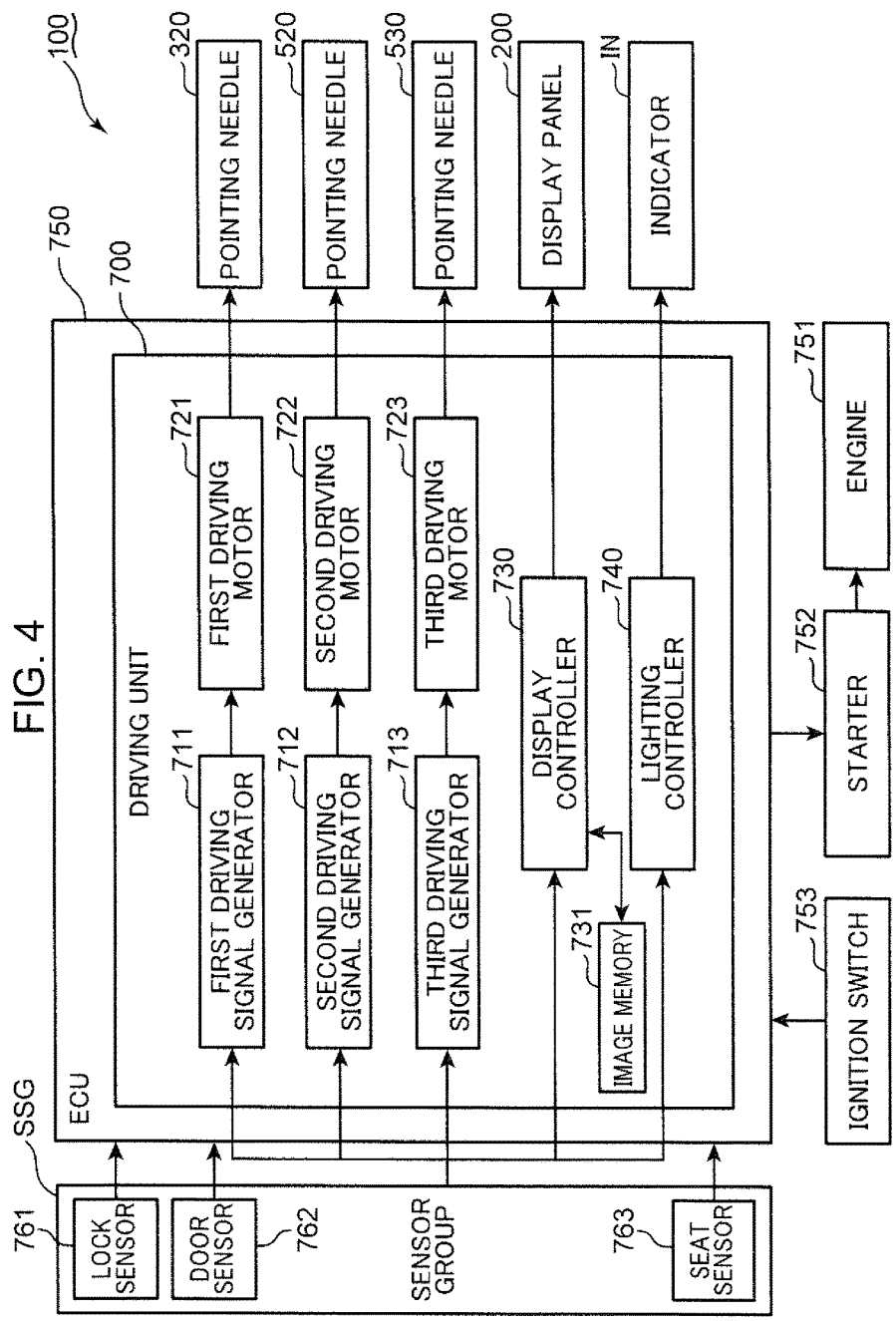
FIG. 4 is a block diagram conceptually indicating the flow of signals in a vehicle including the display device.

FIG. 4 is a block diagram conceptually illustrating the flow of signals in the vehicle including the display device 100. An electronic control unit (ECU) 750 is mounted on the vehicle.

The ECU 750 controls the operation of each unit of the vehicle. The ECU 750 includes the driving unit 700. The ECU 750 may include a microcomputer and a memory. The ECU 750 may include a program stored in the memory. Although the ECU 750 illustrated in FIG. 4 includes the entire driving unit 700, the present embodiment is not limited to this configuration. The ECU 750 may not include the driving unit 700 and may include a portion of the driving unit 700.

The driving unit 700 includes a first driving signal generator 711, a second driving signal generator 712, a third driving signal generator 713, the first driving motor 721, the second driving motor 722, the third driving motor 723, a display controller 730, an image memory 731, and a lighting controller 740.

The first driving signal generator 711 is electrically connected to the first driving motor 721. The first driving motor 721 is mechanically connected to the pointing needle 320. The second driving signal generator 712 is electrically connected to the second driving motor 722. The second driving motor 722 is mechanically connected to the pointing needle 520. The third driving signal generator 713 is electrically connected to the third driving motor 723. The third driving motor 723 is mechanically connected to the pointing needle 530. The display controller 730 is electrically connected to the display panel 200. The lighting controller 740 is electrically connected to the indicator IN.

Various sensor devices (not illustrated) that detect physical amounts which change according to the traveling state of the vehicle are disposed in the vehicle. A sensor group SSG includes these sensor devices. The sensor group SSG generates various detection signals indicating various physical amounts. In the example of FIG. 3, the sensor group SSG includes a sensor that detects an engine speed, a sensor that detects a traveling speed of the vehicle, a sensor that detects a residual fuel amount, and a sensor that detects the water temperature in a radiator. These detection signals are output from the sensor group SSG to the first driving signal generator 711, the second driving signal generator 712, the third driving signal generator 713, and the display controller 730.

In the present embodiment, the sensor group SSG includes a lock sensor 761, a door sensor 762, and a seat sensor 763. The lock sensor 761 detects unlock and lock of a door lock of the vehicle. The door sensor 762 detects opening and closing of doors of the vehicle. The seat sensor 763 detects the occupant getting in the vehicle (specifically, the occupant sitting on a seat of the vehicle). The sensors including the lock sensor 761, the door sensor 762, and the seat sensor 763 that constitute the sensor group SSG may be sensors used in existing vehicles. Therefore, the principle of the present embodiment is not limited to the specific sensor of the sensor group SSG.

The first driving signal generator 711 receives a detection signal indicating a physical amount (in the present embodiment, an engine speed) corresponding to an index indicated by the pointing needle 320. The first driving signal generator 711 generates a driving signal according to the detection signal. The driving signal is output from the first driving signal generator 711 to the first driving motor 721. The first driving motor 721 rotates according to the driving signal. As a result, the pointing needle 320 can rotate on the display board 400.

The second driving signal generator 712 receives a detection signal indicating a physical amount (in the present embodiment, a residual fuel amount) corresponding to an index indicated by the pointing needle 520. The second driving signal generator 712 generates a driving signal according to the detection signal. The driving signal is output from the second driving signal generator 712 to the second driving motor 722. The second driving motor 722 rotates according to the driving signal. As a result, the pointing needle 520 can rotate on the display board 400.

The third driving signal generator 713 receives a detection signal indicating a physical amount (in the present embodiment, the water temperature in the radiator) corresponding to an index indicated by the pointing needle 530. The third driving signal generator 713 generates a driving signal according to the detection signal. The driving signal is output from the third driving signal generator 713 to the third driving motor 723. The third driving motor 723 rotates according to the driving signal. As a result, the pointing needle 530 can rotate on the display board 400.

Conversion from a detection signal to a driving signal may follow various signal processing techniques used in existing analog meters. Therefore, the principle of the present embodiment is not limited to a specific signal processing technique for converting a detection signal to a driving signal.

The display controller 730 receives a detection signal indicating a physical amount (in the present embodiment, a traveling speed of the vehicle) corresponding to the meter image SCI (see FIG. 3) displayed by the display panel 200. The display controller 730 generates an image signal according to the detection signal. The image signal is output from the display controller 730 to the display panel 200. The display panel 200 displays the meter image SCI on the display surface 210 according to the image signal.

A signal processing technique for displaying images from a detection signal may follow various existing image generation techniques. Therefore, the principle of the present embodiment is not limited to a specific signal processing technique for displaying images.

An engine 751, a starter 752, and an ignition switch 753 are further mounted on the vehicle. The engine 751 is an existing driving source for causing the vehicle to travel. The starter 752 is an existing motor for starting the engine 751. The ignition switch 753 is an existing operation unit for starting the engine 751. When the ignition switch 753 is turned on, the ECU 750 supplies electric power to the starter 752. The starter 752 to which electric power is supplied starts the engine 751.

The ignition switch 753 may be a lever, a button, or a dial provided near a driver's seat. The principle of the present embodiment is not limited to a specific structure of the ignition switch 753. The driving source that causes the vehicle to travel is not limited to the engine 751. For example, when the vehicle is an electric vehicle, a motor provided instead of the engine 751 is a driving source, and the starter 752 is not required.

The lighting controller 740 turns the indicator IN on or off according to the detection signal output from the sensor group SSG. When unlock of the door lock is detected by the lock sensor 761 in a state in which the engine 751 is stopped, the ECU 750 starts checking the status of each unit of the vehicle. As for the status of hydraulic pressure or the like which needs to be checked after an operation of a driving source such as the engine 751 starts, the ECU 750 determines a detection signal output from the sensor group SSG and checks the status after the operation of the driving source such as the engine 751 starts.

When opening of the door is detected by the door sensor 762 subsequently to unlock of the door lock, the display controller 730 starts an operation of displaying an opening animation image on the display panel 200. Alternatively, the display controller 730 may start displaying the opening animation image on the display panel 200 when sitting of the occupant is detected by the seat sensor 763 subsequently to opening of the door. Further alternatively, the display controller 730 may start displaying the opening animation image on the display panel 200 when unlock of the door lock is detected by the lock sensor 761. The opening animation image will be described with reference to FIG. 5.

Figure 5:
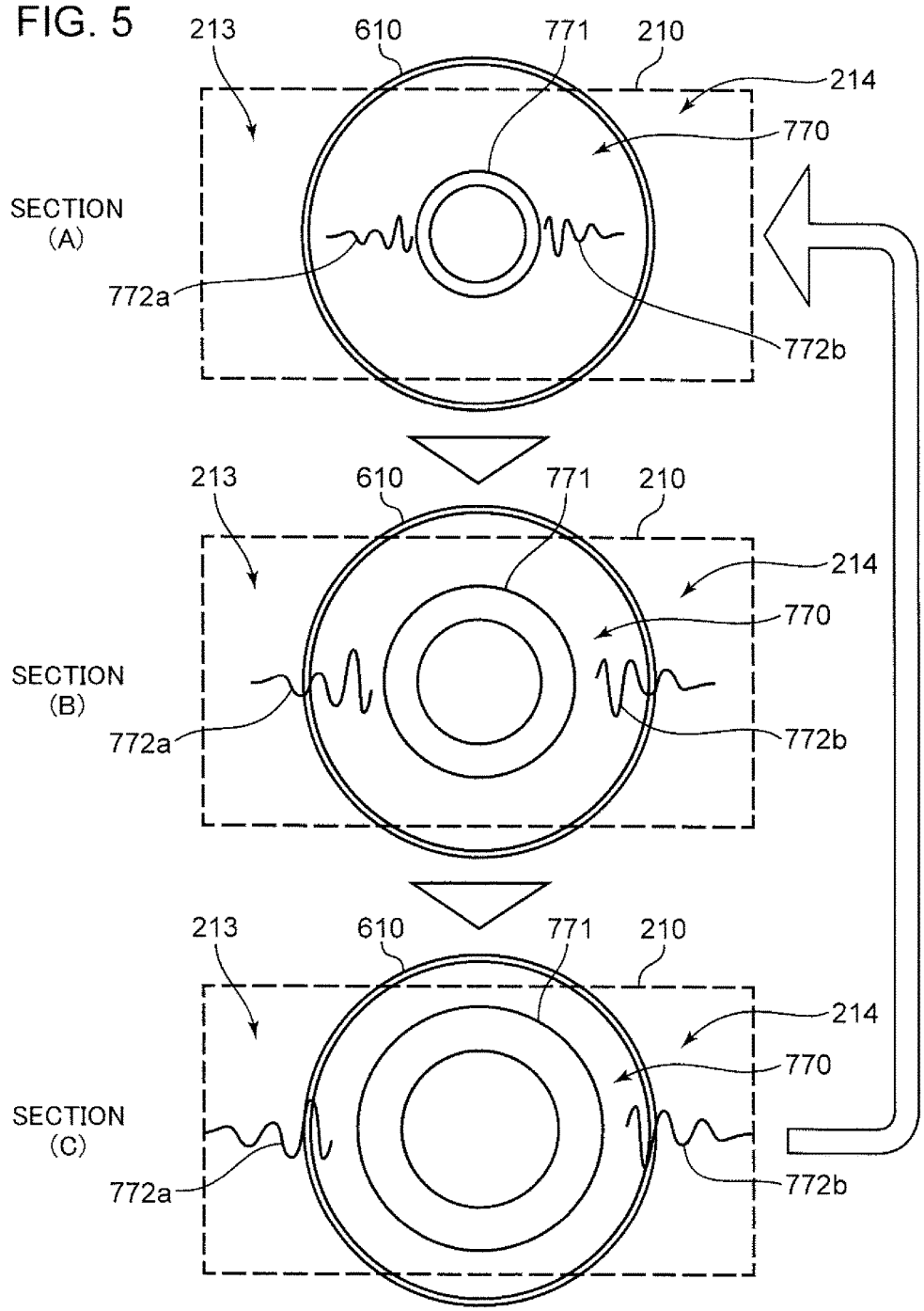
FIG. 5 is a diagram schematically illustrating an opening animation image displayed on a display surface of a display panel.

FIG. 5 is a diagram schematically illustrating an opening animation image 770 displayed on the display surface 210 of the display panel 200. Section (A) illustrates an initial display state of the opening animation image 770. Section (B) illustrates a display state later in time than Section (A). Section (C) illustrates a display state further later in time than Section (B). As illustrated in FIG. 5, the opening animation image 770 includes a ring-shaped graphic object 771 and a pair of left and right wavy graphic objects 772a and 772b (an example of wavy objects). The wavy graphic objects may be an object having a horizontally continuous shape rather than a pair of left and right objects. However, in this example, the wavy graphic object will be described as a pair of left and right objects.

The display controller 730 displays the graphic object 771 at the center of a region of the display surface 210 facing the ring member 610. First, as illustrated in Section (A) of FIG. 5, the display controller 730 displays the graphic object 771 in a predetermined small diameter and a predetermined narrow ring width. The graphic object 771 having the predetermined small diameter and the predetermined narrow ring width illustrated in Section (A) of FIG. 5 is stored in advance in the image memory 731 (see FIG. 4).

As illustrated in Section (B) of FIG. 5, the display controller 730 gradually increases the diameter and the ring width of the graphic object 771. The display controller 730 removes the graphic object 771 in a state illustrated in Section (C) of FIG. 5 in which the diameter and the ring width of the graphic object 771 reach a predetermined size. Subsequently, the display controller 730 displays the image illustrated in Section (A) of FIG. 5.

The display controller 730 displays the wavy graphic object 772a on the left side of the graphic object 771 and displays the wavy graphic object 772b on the right side of the graphic object 771. The graphic objects 772a and 772b are displayed bilaterally symmetric with respect to a vertical line that passes through the center of the display surface 210. In this example, although the graphic objects are described to be horizontally symmetrical, the graphic objects may not necessarily be horizontally symmetrical as long as the objects represent an image which spreads horizontally symmetrical from the central portion.

First, as illustrated in Section (A) of FIG. 5, the display controller 730 displays the graphic objects 772a and 772b in a region of the display surface 210 facing the ring member 610 so as to come into contact with the outer circumference of the graphic object 771. The graphic objects 772a and 772b illustrated in Section (A) of FIG. 5 are stored in advance in the image memory 731 (see FIG. 4).

Subsequently, as illustrated in Section (B) of FIG. 5, the display controller 730 moves the left graphic object 772a toward the left side and moves the right graphic object 772b toward the right side so as to be separated from the outer circumference of the graphic object 771. In the state of Section (B) of FIG. 5, the left graphic object 772a is displayed so as to extend from a region of the display surface 210 facing the inner side of the ring member 610 to reach the display region 213. Moreover, the right graphic object 772b is displayed so as to extend from a region of the display surface 210 facing the inner side of the ring member 610 to reach the display region 214.

The display controller 730 moves the left graphic object 772a further toward the left side until the left end thereof comes into contact with the left end of the display surface 210. Moreover, the display controller 730 moves the right graphic object 772b further toward the right side until the right end thereof comes into contact with the right end of the display surface 210. The display controller 730 removes the graphic objects 772a and 772b in a state illustrated in Section (C) of FIG. 5 in which the left end of the left graphic object 772a comes into contact with the left end of the display surface 210 and the right end of the right graphic object 772b comes into contact with the right end of the display surface 210. Subsequently, the display controller 730 displays the image illustrated in Section (A) of FIG. 5.

In the present embodiment, the display controller 730 repeatedly displays the images of Sections (A), (B), and (C) at a cycle (for example, approximately 1 second) close to the heartbeat of a human. As a result, such a dramatic presentation as the beating of the heart of a vehicle is given.

Although FIG. 5 illustrates that only the size and the position of the graphic objects 771, 772a, and 772b are changed, the present embodiment is not limited to this. Alternatively, the display controller 730 may periodically change the color of the graphic objects 771, 772a, and 772b. Further alternatively, the display controller 730 may periodically change the brightness of the graphic objects 771, 772a, and 772b instead of or in addition to the color.

Returning to FIG. 4, when the ignition switch 753 is operated and the engine 751 is started by the starter 752, the ECU 750 notifies a checking result of the status of each unit of the vehicle to the display controller 730. The display controller 730 displays the status checklist on the display panel 200 on the basis of the notified checking result.

Figure 6:
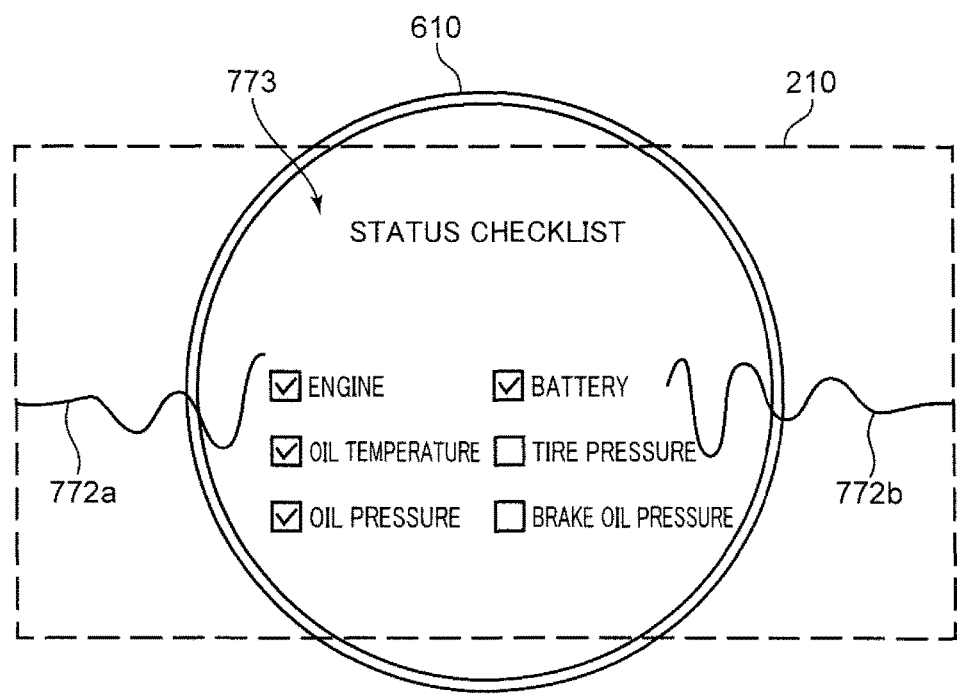
FIG. 6 is a diagram schematically illustrating an example of a status checklist displayed on the display surface of the display panel.

FIG. 6 is a diagram schematically illustrating an example of a status checklist 773 displayed on the display surface 210 of the display panel 200. In the example of FIG. 6, a checking item includes "engine", "battery", "oil temperature", "tire pressure", "oil pressure", and "brake oil pressure".

A check box is assigned to each checking item. In FIG. 6, a check mark is filled in the check boxes of "engine", "battery", "oil temperature", and "oil pressure". These check boxes indicate that the statuses of these checking items are normal. Moreover, a check mark is not filled in the check boxes of "tire pressure" and "brake oil pressure". These check boxes indicate that the statuses of these checking items are under checking.

When displaying the status checklist 773 on the display surface 210 of the display panel 200, as illustrated in FIG. 6, the display controller 730 displays only the graphic objects 772a and 772b of the opening animation image 770 without displaying the graphic object 771. In this way, the opening animation image 770 does not disturb the occupant looking at the status checklist 773.

In FIG. 6, although the graphic objects 772a and 772b are continuously displayed even after the status checklist 773 is displayed, the present embodiment is not limited to this. Alternatively, the display controller 730 may not display the graphic objects 772a and 772b as well as the graphic object 771 when the status checklist 773 is displayed. That is, the display controller 730 may remove the opening animation image 770 when the display of the status checklist 773 starts.

Figure 7:
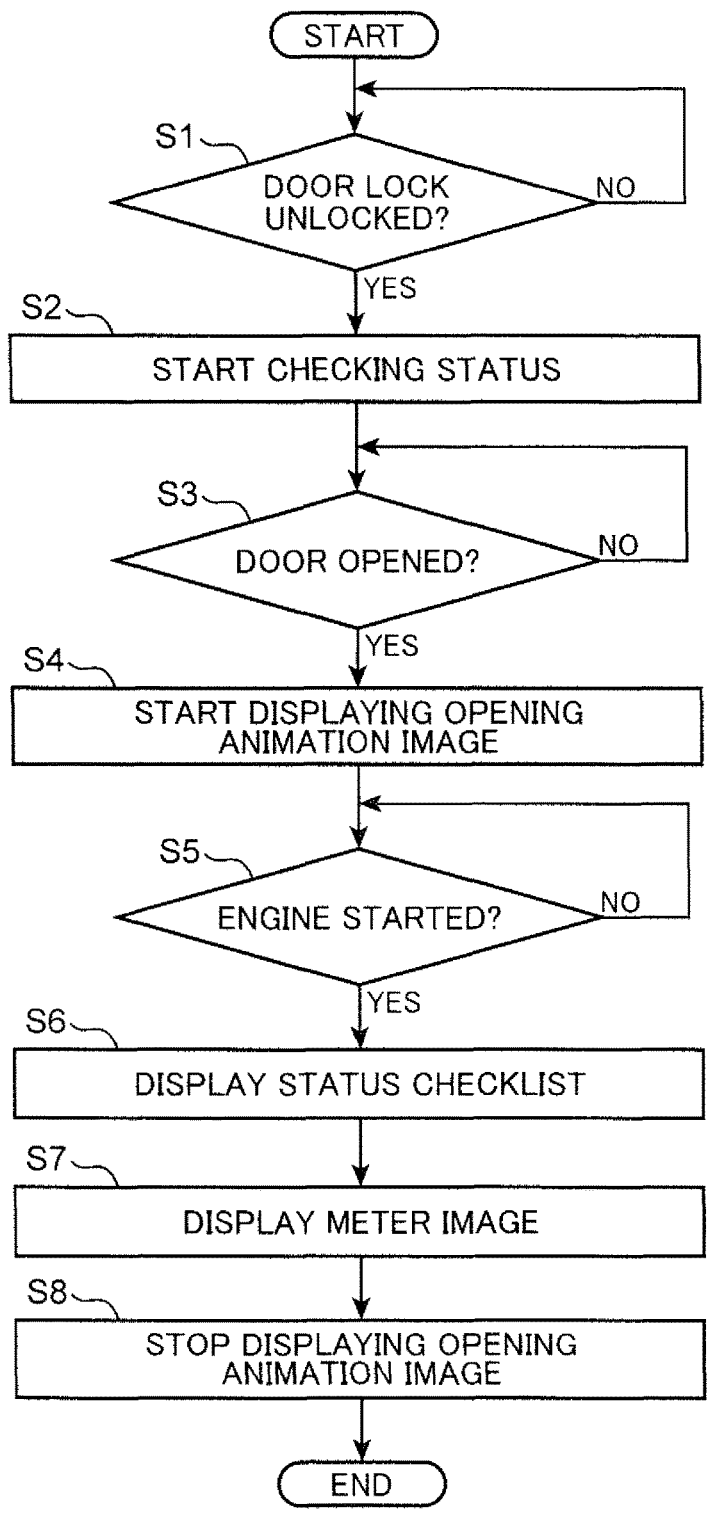
FIG. 7 is a flowchart schematically illustrating an operation procedure in the vehicle including the display device.

FIG. 7 is a flowchart schematically illustrating an operation procedure in the vehicle including the display device 100. First, in S1, the ECU 750 determines whether or not the door lock is unlocked on the basis of the detection signal from the lock sensor 761. Standby is performed when the door lock is not unlocked (NO in S1). On the other hand, when the door lock is unlocked (YES in S1), the ECU 750 starts checking the status of each unit of the vehicle (S2).

In S3, the ECU 750 determines whether or not a closed door is opened on the basis of the detection signal from the door sensor 762 (an example of the detector). Standby is performed when the door is not open (NO in S3). On the other hand, when the door is opened (YES in S3), the display controller 730 starts displaying the opening animation image 770 described using FIG. 5 on the display panel 200 (S4).

In S5, the ECU 750 determines whether or not the engine 751 is started. Standby is performed when the engine 751 is not started (NO in S5). On the other hand, when the engine 751 is started (YES in S5), the display controller 730 displays the status checklist 773 described using FIG. 6 on the display panel 200 (S6).

When the checking result of all statuses is displayed, after the elapse of a predetermined period (in the present embodiment, 1 second for example), the display controller 730 displays the meter image SCI described using FIG. 3 on the display panel 200 in S7. In S8, the display controller 730 stops displaying the opening animation image 770.

As described above, in the present embodiment, checking of the status of the vehicle starts when the door lock is unlocked, and the displaying of the opening animation image 770 starts when the door is opened. Moreover, when the engine 751 is started, the status checklist 773 is displayed. Therefore, according to the present embodiment, it is possible to attract the eyes of the occupant toward the display panel 200 from the time point at which the occupant gets into the vehicle. In this way, it is possible to cause the occupant to look at the status checklist of the vehicle. As a result, it is possible to enhance the understanding of the occupant on the vehicle status.

According to the present embodiment, by displaying the opening animation image 770 on the display panel 200, it is possible to elevate feeling such as expectation or pleasure of the occupant when starting driving.

According to the present embodiment, the display controller 730 removes the graphic object 771 in a state illustrated in Section (C) of FIG. 5 in which the diameter and the ring width of the graphic object 771 reach a predetermined size. Moreover, the display controller 730 removes the graphic objects 772a and 772b in a state illustrated in Section (C) of FIG. 5 in which the left end of the left graphic object 772a comes into contact with the left end of the display surface 210 and the right end of the right graphic object 772b comes into contact with the right end of the display surface 210. By this removal, it is possible to give a surprise to the occupant. As a result, it is possible to further attract the attention of the occupant to the display region on the inner side of the ring member 610 of the display panel 200.

[Modification]

(1) In the above-described embodiment, the display controller 730 displays the status checklist 773 on the display panel 200. However, the embodiment is not limited to this. The display controller 730 may display a vehicle state including another item of information relating to the vehicle, for example, on the display panel 200.

Figure 8:
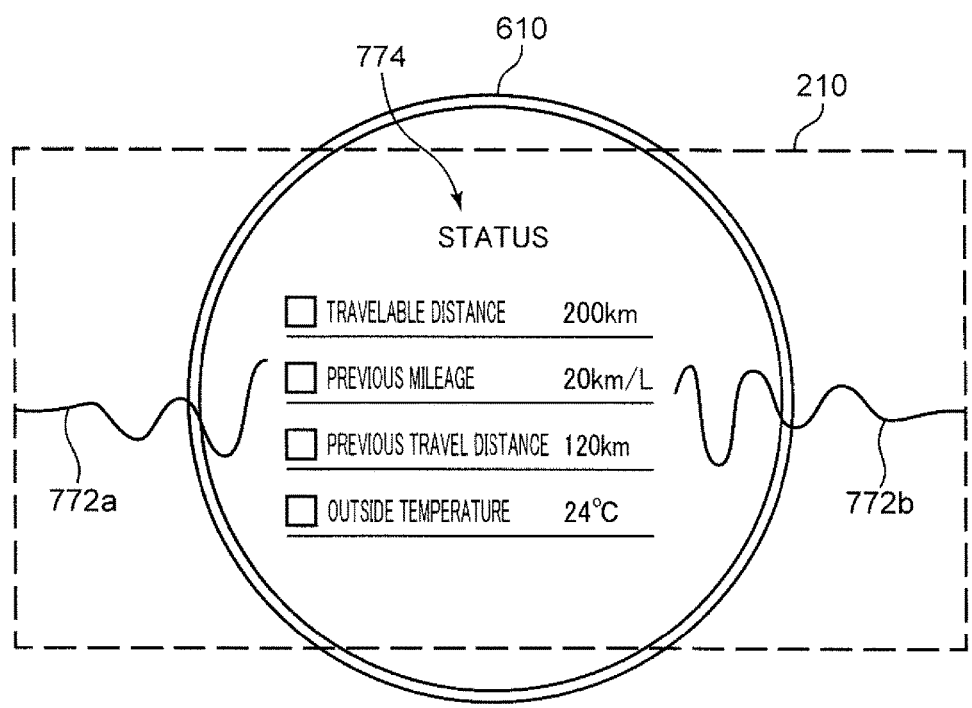
FIG. 8 is a diagram schematically illustrating an example of the status of the vehicle displayed on the display surface of the display panel.

FIG. 8 is a diagram schematically illustrating an example of a vehicle status 774 displayed on the display surface 210 of the display panel 200. In the example of FIG. 8, the vehicle status 774 includes "travelable distance", "previous mileage", "previous travel distance", and "outside temperature".

The ECU 750 may store a travel distance per trip in an internal memory whenever the vehicle makes a trip. The ECU 750 may calculate a mileage from the travel distance and a decrease in the residual fuel amount whenever the vehicle makes a trip, and may store the calculated mileage in the internal memory. The ECU 750 may calculate the travelable distance when fuel is not supplied from the residual fuel amount and the previous mileage. The sensor group SSG may include a temperature sensor that detects the outside temperature.

When the ignition switch 753 is operated and the engine 751 is started by the starter 752, the ECU 750 may notify the calculated travelable distance, the previous mileage and the previous travel distance stored in the memory, and the outside temperature detected by the temperature sensor to the display controller 730. The display controller 730 may display the vehicle status 774 on the display surface 210 of the display panel 200 on the basis of the notified information as illustrated in FIG. 8.

(2) In the above-described embodiment, the display controller 730 starts displaying the opening animation image 770 when the opening of the door is detected by the door sensor 762. However, the embodiment is not limited to this. Alternatively, the display controller 730 may start displaying the opening animation image 770 when unlock of the door lock is detected by the lock sensor 761 (an example of the detector). Further alternatively, the display controller 730 may start displaying the opening animation image 770 when sitting of the occupant is detected by the seat sensor 763 (an example of the detector).

(3) In the example of FIG. 3, the image of a speedometer is employed as the meter image SCI displayed in the ring-shaped member 600. However, this is an example only, and another image (for example, the image of a tachometer, a temperature meter, or a fuel meter) may be employed.

(4) A vehicle exterior image schematically indicating an exterior view of the vehicle may be further stored in advance in the image memory 731 (see FIG. 4). The display controller 730 may display the vehicle exterior image stored in the image memory 731 on the display panel 200 so as to overlap the opening animation image 770 according to opening and closing of the door. The vehicle exterior image will be described with reference to FIGS. 9 to 11.

Figure 9:
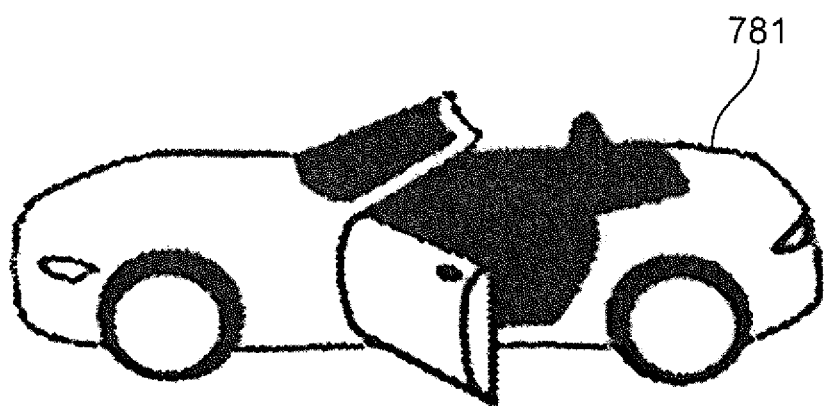
FIG. 9 is a diagram illustrating a vehicle exterior image stored in an image memory.
Figure 10:
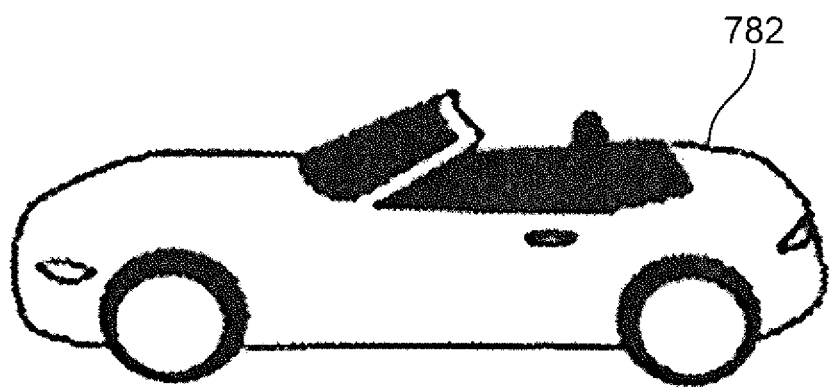
FIG. 10 is a diagram illustrating a vehicle exterior image stored in the image memory.

FIGS. 9 and 10 are diagrams illustrating a vehicle exterior image stored in the image memory 731. FIG. 9 illustrates a vehicle exterior image 781 with a door opened. FIG. 10 illustrates a vehicle exterior image 782 with a door closed.

Figure 11:
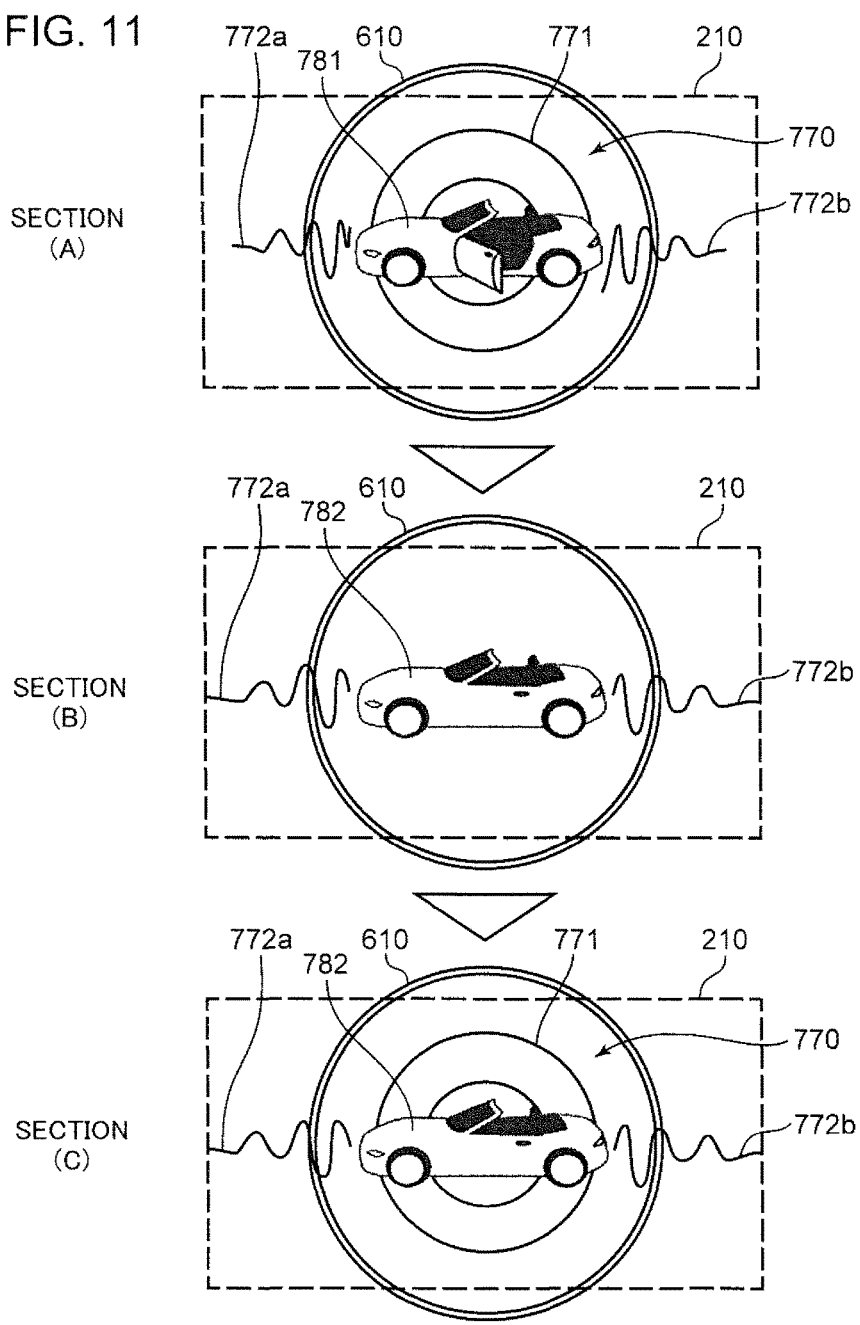
FIG. 11 is a diagram schematically illustrating a vehicle exterior image displayed on the display surface of the display panel.

FIG. 11 is a diagram schematically illustrating a vehicle exterior image displayed on the display surface 210 of the display panel 200. The vehicle exterior image 781 with the door opened is displayed in Section (A) of FIG. 11. The vehicle exterior image 782 with the door closed is displayed in Section (B) of FIG. 11. Section (C) of FIG. 11 is a diagram illustrating a display state later in time than Section (B), and the vehicle exterior image 782 with the door closed is displayed similarly to Section (B).

When the opening of the door is detected by the door sensor 762, as illustrated in Section (A) of FIG. 11, the display controller 730 displays the vehicle exterior image 781 with the door opened so as to overlap the opening animation image 770. After that, when the closing of the door is detected by the door sensor 762, the display controller 730 displays the vehicle exterior image 782 with the door closed as illustrated in Section (B) of FIG. 11. The display controller 730 removes the vehicle exterior image 782 with the door closed after displaying the vehicle exterior image 782 with the door closed for a predetermined period (in this modification (4), 1 second for example) from Section (B) to Section (C).

As illustrated in Sections (A) to (C) in FIG. 11, while the vehicle exterior images 781 and 782 are being displayed, the display controller 730 displays the opening animation image 770 on the display surface 210 of the display panel 200.

The display controller 730 displays, for example, the vehicle exterior images 781 and 782 on a first layer and displays the opening animation image 770 (the graphic objects 771, 772a, and 772b) on a second layer so that the priority level of the image displayed on the first layer is higher than that of the second layer. In this way, such image display as illustrated in Sections (A) to (C) of FIG. 11 is realized.

Similarly to the above-described embodiment, when the ignition switch 753 (see FIG. 4) is operated and the engine 751 is started by the starter 752, the ECU 750 notifies the checking result of the status of each unit of the vehicle to the display controller 730. The display controller 730 displays the status checklist 773 (see FIG. 6) on the display panel 200 on the basis of the notified checking result.

Figure 12:
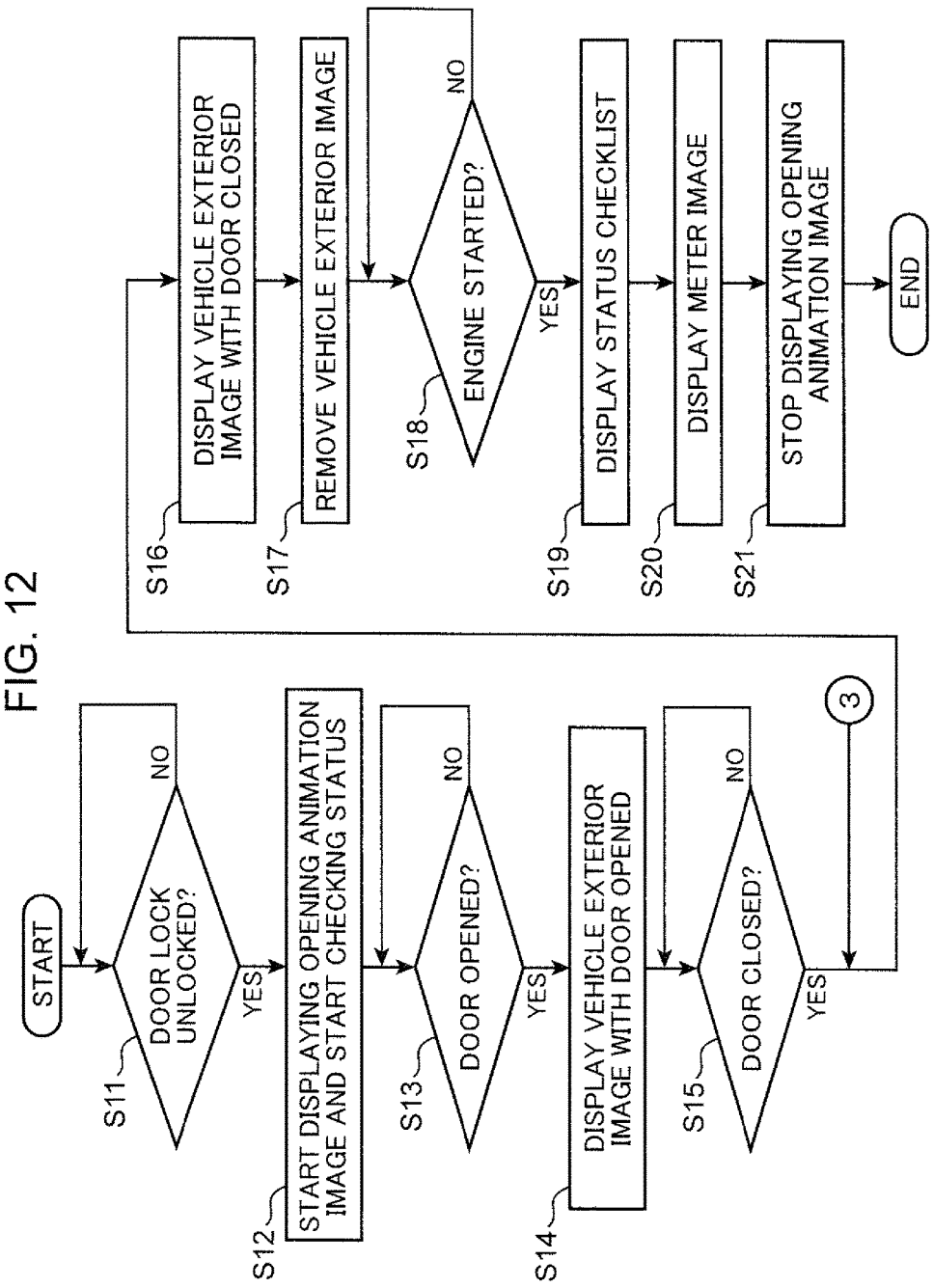
FIG. 12 is a flowchart schematically illustrating an operation procedure partially different from that of FIG. 7, in the vehicle including the display device.

FIG. 12 is a flowchart schematically illustrating an operation procedure of this modification (4) in the vehicle including the display device 100. First, in S11, the ECU 750 determines whether or not the door lock is unlocked on the basis of the detection signal from the lock sensor 761. Standby is performed when the door lock is not unlocked (NO in S11). On the other hand, when the door lock is unlocked (YES in S11), the display controller 730 starts displaying the opening animation image 770 described using FIG. 5 on the display panel 200, and the ECU 750 starts checking the status of each unit of the vehicle (S12).

In S13, the ECU 750 determines whether or not a closed door is opened on the basis of the detection signal from the door sensor 762. Standby is performed when the door is not opened (NO in S13). On the other hand, when the door is opened (YES in S13), the display controller 730 starts displaying the vehicle exterior image 781 with the door opened described using FIG. 11 on the display panel 200 (S14).

In S15, the ECU 750 determines whether or not the open door is closed on the basis of the detection signal from the door sensor 762. Standby is performed when the door is not closed (NO in S15). On the other hand, when the open door is closed (YES in S15), the display controller 730 displays the vehicle exterior image 782 with the door closed described using FIG. 11 on the display panel 200 (S16). The display controller 730 removes the vehicle exterior image 782 after displaying the vehicle exterior image 782 with the door closed on the display panel 200 for a predetermined period (S17).

In S18, the ECU 750 determines whether or not the engine 751 is started. Standby is performed when the engine 751 is not started (NO in S18). On the other hand, when the engine 751 is started (YES in S18), the display controller 730 displays the status checklist 773 described using FIG. 6 on the display panel 200 (S19).

When the checking result of all statuses is displayed, after the elapse of a predetermined period (in this modification (4), 1 second for example), the display controller 730 displays the meter image SCI described using FIG. 3 on the display panel 200 in S20. In S21, the display controller 730 stops displaying the opening animation image 770.

As described above, in this modification (4), when the door lock is unlocked, the checking of the vehicle status and the displaying of the opening animation image 770 start. The vehicle exterior image 781 with the door opened is displayed when the door is opened, and the vehicle exterior image 782 with the door closed is displayed when the door is closed. When the engine 751 is started, the status checklist 773 is displayed. Therefore, according to this modification (4), it is possible to attract the eyes of the occupant toward the display panel 200 from the time point at which the occupant gets into the vehicle and to allow the occupant to recognize the open-close state of the door.

According to this modification (4), by continuously displaying the opening animation image 770 on the display panel 200, it is possible to maintain a state in which the eyes of the occupant are directed to the display panel 200 and to cause the occupant to look at the status checklist of the vehicle. As a result, it is possible to enhance the understanding of the occupant on the vehicle status.

According to this modification (4), by displaying the opening animation image 770 on the display panel 200, it is possible to elevate feeling such as expectation or pleasure of the occupant when starting driving.

(5) In the modification (4), although the vehicle exterior images 781 and 782 schematically illustrating the exterior view of the vehicle are stored in advance in the image memory 731, the modification (4) is not limited to this. Personal users of vehicles often purchase and drive their vehicles since they like the vehicles. Hence, such a schematic exterior image as the modification (4) may be displayed as long as the vehicle has a characteristic exterior view. However, in order to enhance the possessing pleasure of the favorite vehicle of the occupant and the expectation of driving, a more real image or a possibly real picture indicating the exterior view of the vehicle on which the display device 100 is mounted may be stored in advance in the image memory 731 as the vehicle exterior image.

Figure 13:
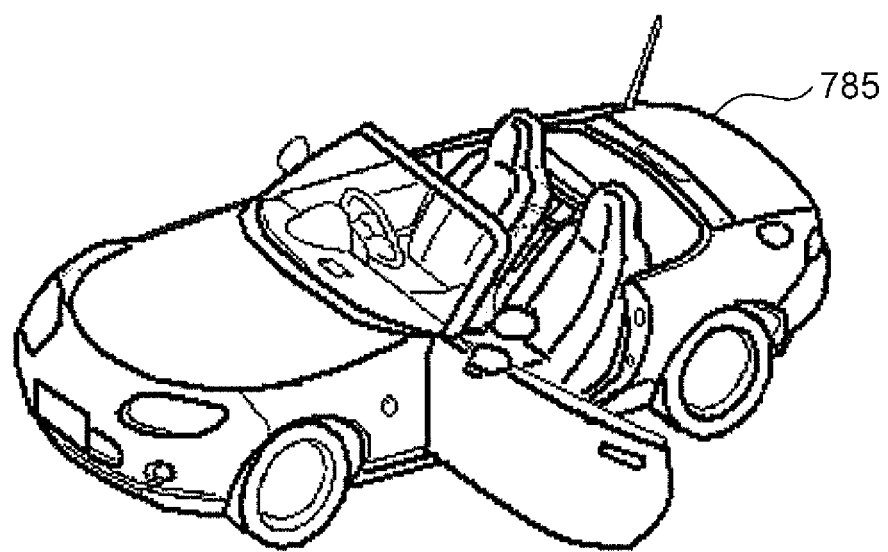
FIG. 13 is a diagram illustrating another example of the vehicle exterior image stored in the image memory.
Figure 14:
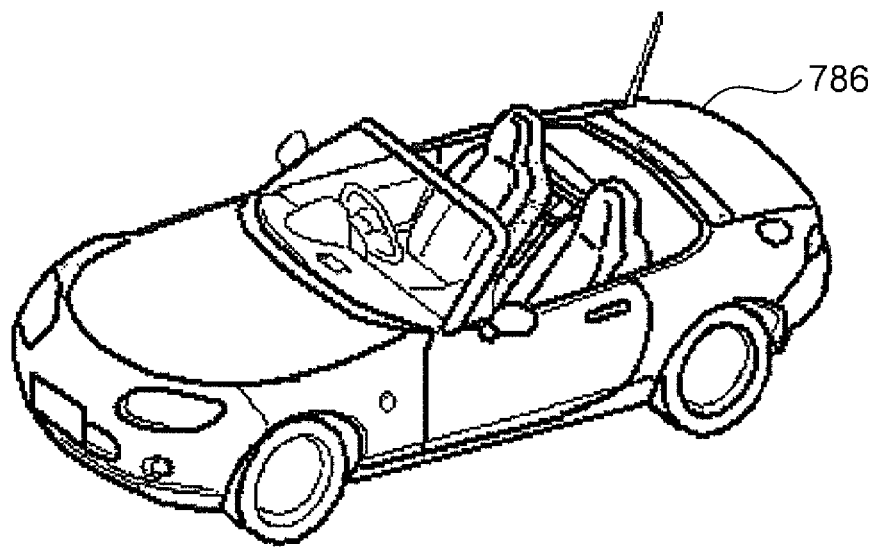
FIG. 14 is a diagram illustrating another example of the vehicle exterior image stored in the image memory.

FIGS. 13 and 14 are diagrams illustrating another example of the vehicle exterior image stored in the image memory 731. FIGS. 13 and 14 illustrate the vehicle exterior image illustrating the exterior view of the vehicle on which the display device 100 is mounted. FIG. 13 illustrates a detail vehicle exterior image 785 having a door opened. FIG. 14 illustrates a detail vehicle exterior image 786 having a door closed.

Such simple vehicle exterior images 781 and 782 as illustrated in FIGS. 9 and 10 may be used as long as the image clearly shows the feature of the vehicle on which the display device 100 is mounted and the occupant feels that the vehicle is a vehicle which the occupant is getting in. However, it is preferable to use such detail vehicle exterior images 785 and 786 as illustrated in FIGS. 13 and 14 since the images are similar to the real vehicle.

In FIGS. 13 and 14, the vehicle exterior images 785 and 786 illustrating the exterior view of the vehicle which the occupant actually gets in are used. In this way, it is possible to enhance the affection for the vehicle and the elation when starting driving while causing the occupant to recognize the open-close state of the door. Particularly, when the vehicle is unique and has a characteristic design, it is possible to enhance the driving pleasure, the possessing pleasure or the like more than simply displaying the vehicle schematically as illustrated in FIGS. 9 and 10.

A picture image which is more similar to the real vehicle than that illustrated in FIGS. 13 and 14 may be used. In this way, it is possible to further enhance the occupant's affection for the vehicle.

Further alternatively, a plurality of vehicle exterior images illustrating the exterior view of the vehicle different from the vehicle on which the display device 100 is mounted may be stored in advance in the image memory 731 in addition to the vehicle on which the display device 100 is mounted. In this case, images or pictures of a dream vehicle that the user can hardly purchase and get in, such as images or pictures of a user's favorite old vehicle, may be stored in advance, and the user may select a vehicle exterior image to be used for display on the display panel 200 from the plurality of vehicle exterior images stored in the image memory 731.

Figure 15:
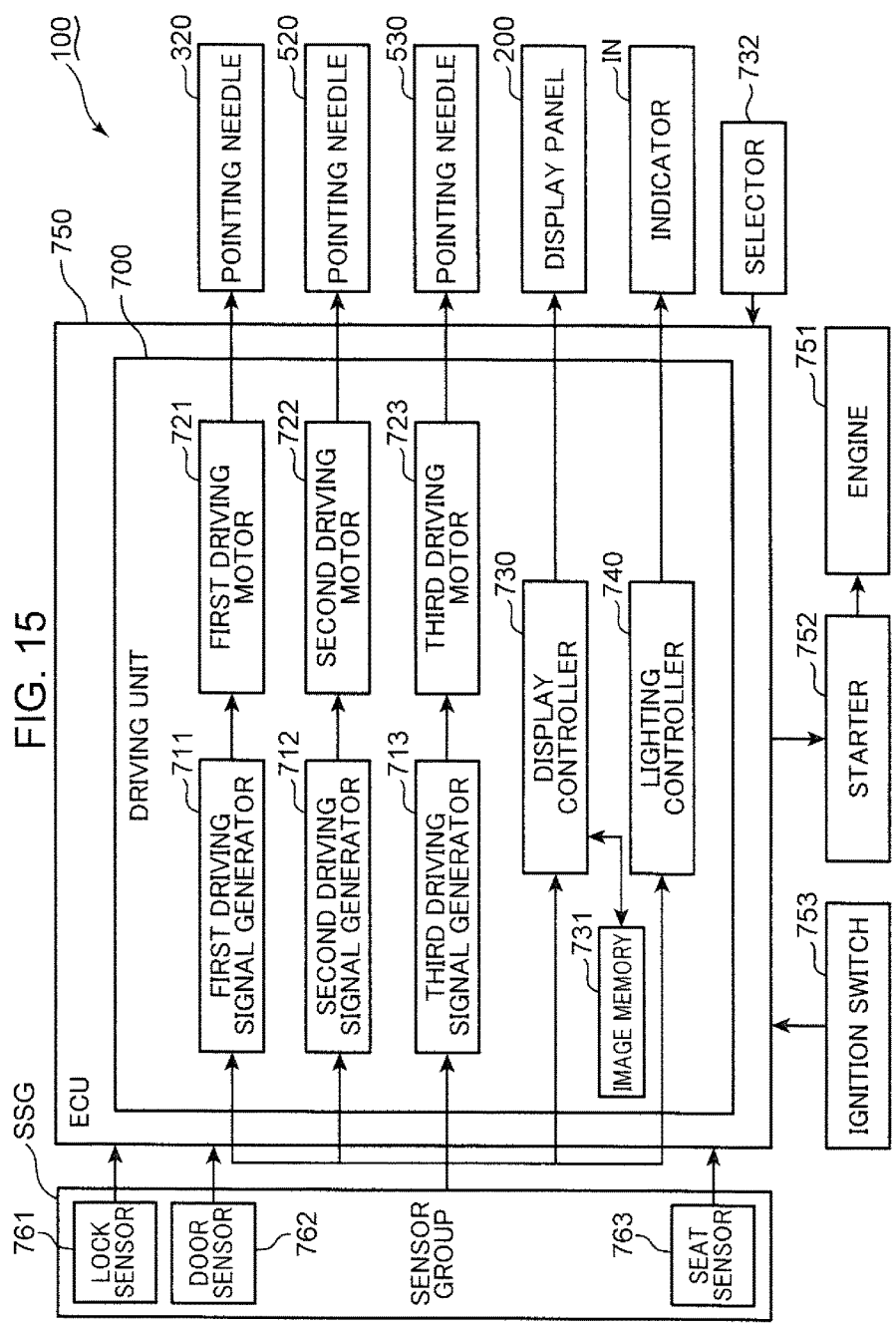
FIG. 15 is a block diagram conceptually illustrating an example different from that of FIG. 4, of the flow of signals in the vehicle including the display device.
Figure 16:
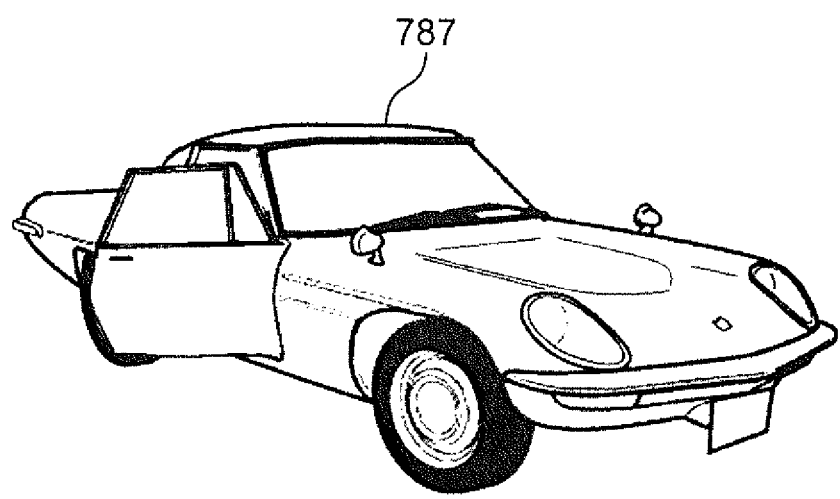
FIG. 16 is a diagram illustrating another example of the vehicle exterior image stored in the image memory.
Figure 17:
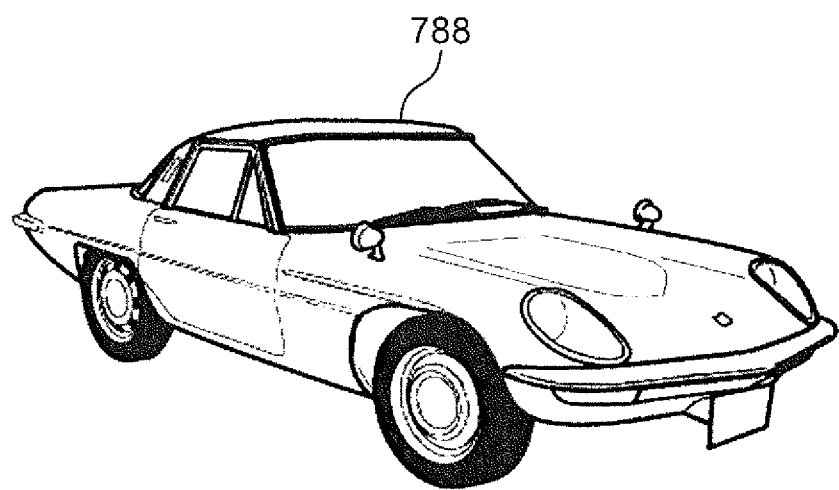
FIG. 17 is a diagram illustrating another example of the vehicle exterior image stored in the image memory.

FIG. 15 is a block diagram conceptually illustrating an example different from that of FIG. 4, of the flow of signals in the vehicle including the display device 100. FIGS. 16 and 17 are diagrams illustrating another example of a vehicle exterior image stored in the image memory 731. FIG. 16 illustrates a vehicle exterior image 787 illustrating an exterior view of an old-model vehicle with a door opened. FIG. 17 illustrates a vehicle exterior image 788 illustrating an exterior view of the old-model vehicle illustrated in FIG. 16 with the door closed.

In the example of FIG. 15, a selector 732 is further mounted on the vehicle. The display controller 730 displays a selection screen for selecting either the vehicle on which the display device 100 is mounted, which is illustrated in FIGS. 13 and 14, or the old-model vehicle which is illustrated in FIGS. 16 and 17 on an initial setting screen, for example. The user operates the selector 732 to select a vehicle exterior image to be used for display on the display panel 200. The selector 732 may be a lever, a button, or a dial provided near a driver's seat.

When the vehicle on which the display device 100 is mounted, illustrated in FIGS. 13 and 14, for example, is selected by the selector 732, the display controller 730 displays the vehicle exterior image 785 of FIG. 13 on the display panel 200 in S14 of FIG. 12 and displays the vehicle exterior image 786 of FIG. 14 on the display panel 200 in S16 of FIG. 12. Moreover, when the old-model vehicle of FIGS. 16 and 17, for example, is selected by the selector 732, the display controller 730 displays the vehicle exterior image 787 of FIG. 16 on the display panel 200 in S14 of FIG. 12 and displays the vehicle exterior image 788 of FIG. 17 on the display panel 200 in S16 of FIG. 12.

According to the modifications illustrated in FIGS. 15 to 17, by using the selector 732 to select a vehicle that the occupant can hardly purchase even if the vehicle is a favorite vehicle because the vehicle is an old-model vehicle, the occupant can display the selected vehicle exterior image on the display panel 200. Therefore, the occupant can enjoyably watch the vehicle exterior image displayed on the display panel 200.

(6) In the modification (4), although the vehicle exterior image 782 with the door closed is not displayed again after the vehicle exterior image 782 is removed once, the embodiment is not limited to this. Alternatively, the display controller 730 may display the vehicle exterior image with the door opened again on the display panel 200 when the door of the vehicle is opened after the vehicle exterior image 782 with the door closed is removed.

Figure 18:
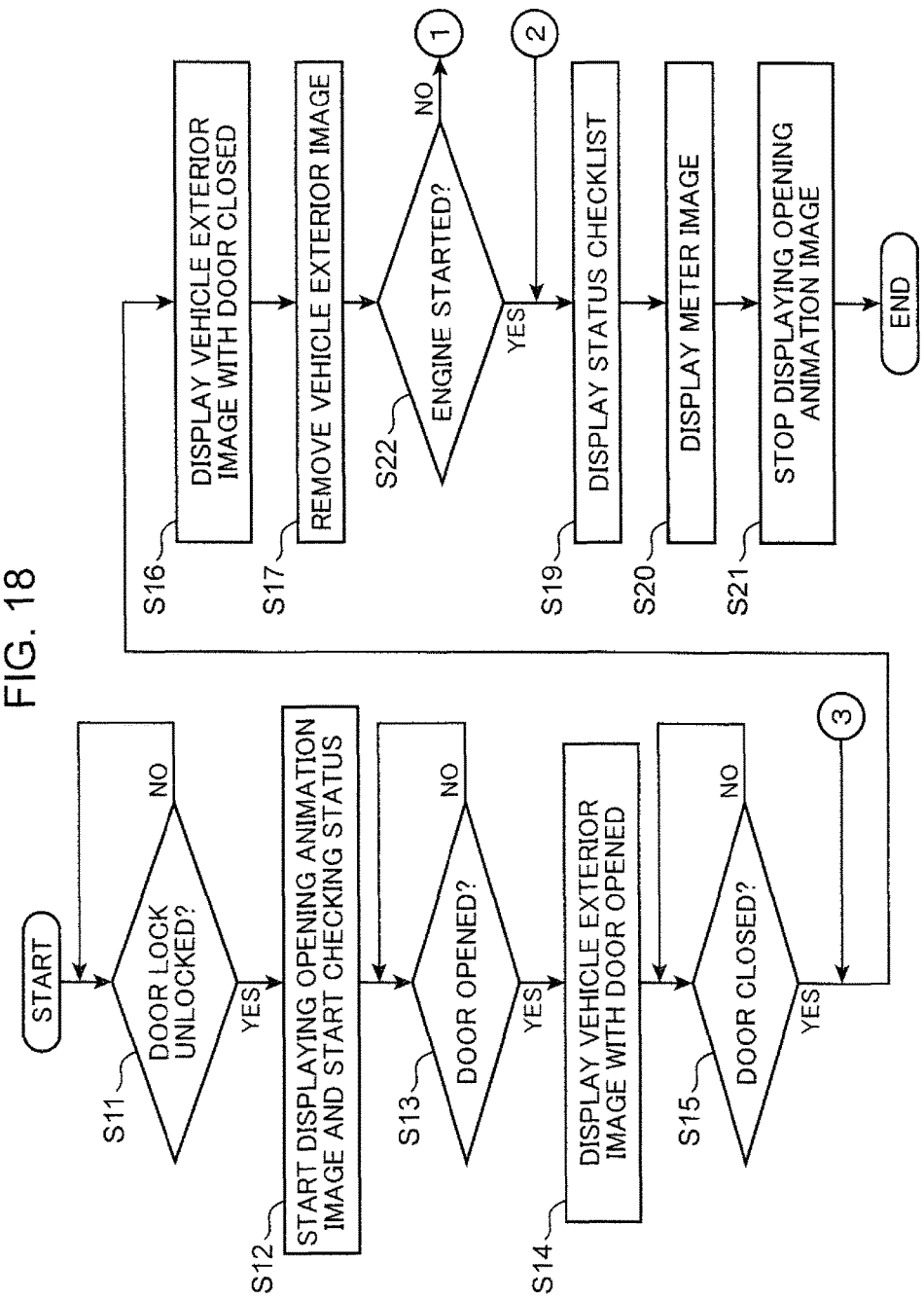
FIG. 18 is a flowchart schematically illustrating an operation procedure different from that of FIG. 12, in the vehicle including the display device.
Figure 19:
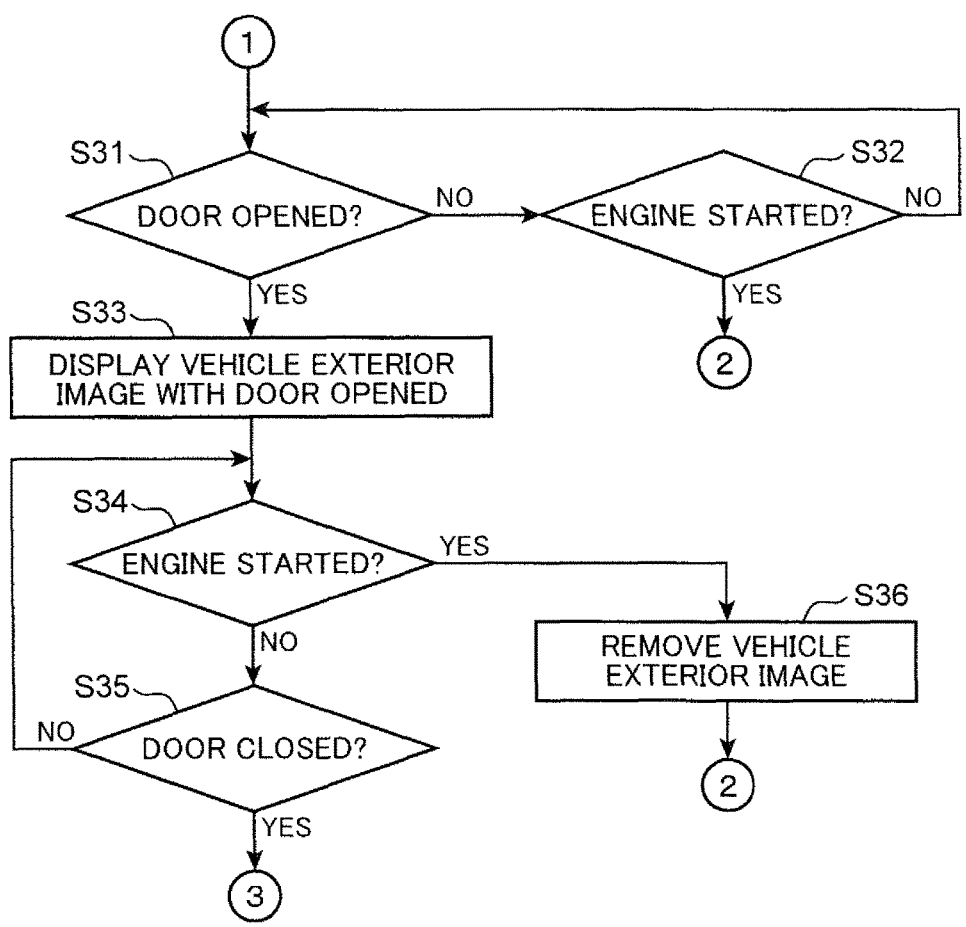
FIG. 19 is a flowchart schematically illustrating an operation procedure different from that of FIG. 12, in the vehicle including the display device.

FIGS. 18 and 19 are flowcharts schematically illustrating an operation procedure different from that illustrated in FIG. 12, in the vehicle including the display device 100. The same steps as those of FIG. 12 will be denoted by the same reference numerals, and the detailed description thereof will be omitted. S11 to S17 are the same as S11 to S17 in FIG. 12. In S22 subsequent to S17, the ECU 750 determines whether or not the ignition switch 753 is operated and the engine 751 is started by the starter 752. The process proceeds to S31 when the engine 751 is not started (NO in S22). On the other hand, the process proceeds to S19 when the engine 751 is started (YES in S22). S19 to S21 are the same as S19 to S21 in FIG. 12.

In S31, the ECU 750 determines whether or not the closed door is opened on the basis of the detection signal from the door sensor 762. When the door is not opened (NO in S31), the ECU 750 determines whether or not the engine 751 is started (S32). The process returns to S31 when the engine 751 is not started (NO in S32), and the process returns to S19 when the engine 751 is started (YES in S32).

In S31, when the door is opened (YES in S31), the display controller 730 displays the vehicle exterior image 781 with the door opened described using FIG. 11 on the display panel 200 (S33).

In S34, the ECU 750 determines whether or not the engine 751 is started. When the engine 751 is not started (NO in S34), the ECU 750 determines whether or not the open door is closed on the basis of the detection signal from the door sensor 762 (S35). The process returns to S34 when the door is not closed (NO in S35). On the other hand, the process returns to S16 when the open door is closed (YES in S35).

In S34, when the engine 751 is started (YES in S34), the display controller 730 removes the vehicle exterior image 781 displayed on the display panel 200 (S36) and the process returns to S19.

According to the modifications illustrated in FIGS. 18 and 19, when the door of the vehicle is opened again before the engine is started, the vehicle exterior image 781 with the door opened is displayed on the display panel 200. When the door of the vehicle is closed, the vehicle exterior image 782 with the door closed is displayed on the display panel 200. Therefore, even when a fellow passenger of the driver gets into the vehicle, the vehicle exterior images 781 and 782 can be displayed on the display panel 200. As a result, even when a fellow passenger gets into the vehicle, it is possible to allow the occupant to recognize the open-close state of the door.

According to the modifications illustrated in FIGS. 18 and 19, the vehicle exterior image is removed when the engine is started before the open door is closed in a state in which the vehicle exterior image 781 with the door open is displayed on the display panel 200. Therefore, the vehicle exterior image does not disturb the display of the status checklist 773 of the vehicle.

The specific embodiments described above mainly include inventions having the following configuration.

An aspect of the present invention is a vehicular display device mounted on a vehicle, including: a display panel that displays information relating to the vehicle; a display controller that displays an opening animation image in a predetermined display region of the display panel; and a detector that detects a getting-in action associated with an occupant getting in the vehicle, wherein the display controller displays a checklist indicating a checking result of a state of each unit of the vehicle in the predetermined display region as the information relating to the vehicle after a driving source for traveling of the vehicle is started, the display controller starts a display operation of displaying the opening animation image in the display region of the display panel when the getting-in action is detected by the detector, and continues the display operation at least until the checklist is displayed, and the display controller displays, as the opening animation image, an animation image, in which an image display operation of changing a display form of a graphic object is periodically repeated, on the display panel.

According to this configuration, the checklist indicating the checking result of the state of each unit of the vehicle is displayed in the predetermined display region of the display panel as the information relating to the vehicle using the display that displays the information relating to the vehicle after the driving source for traveling of the vehicle is started. Moreover, when the getting-in action associated with the occupant getting in the vehicle is detected by the detector, the display operation of displaying the opening animation image in the predetermined display region of the display panel starts, and the display operation is continued at least until the checklist is displayed. The animation image in which the image display operation of changing the display form of the graphic object is periodically repeated is displayed on the display panel as the opening animation image.

Therefore, it is possible to attract the attention of the occupant toward the predetermined display region of the display panel from the time point at which the occupant gets in the vehicle. As a result, the occupant can better understand the checking result when the checklist is displayed in the predetermined display region of the display panel as the information relating to the vehicle. Moreover, by displaying the opening animation image, it is possible to elevate feeling such as expectation or pleasure of the occupant when starting driving. Furthermore, since the checklist and the opening animation are displayed using the predetermined display region of the display that displays vehicle speed information or the like, various items of information can be displayed in a limited display region.

According to this configuration, the checklist indicating the checking result of the state of each unit of the vehicle is displayed in the predetermined display region of the display panel as the information relating to the vehicle. Therefore, by displaying the opening animation image to attract the attention of the occupant toward the predetermined display region of the display panel, it is possible to cause the occupant to better understand the checking result of the state of each unit of the vehicle.

According to this configuration, the display of the opening animation image is continued until the checklist is displayed in the predetermined display region of the display panel. Therefore, it is possible to better attract the attention of the occupant toward the checklist.

In the above-described aspect, the detector may include, as a sensor that detects the getting-in action, at least one of a lock sensor that detects unlocking of a door lock of the vehicle by the occupant, a door sensor that detects opening of a door of the vehicle by the occupant, and a seat sensor that detects the occupant getting in the vehicle.

According to this configuration, the display of the opening animation image starts when at least one of unlock of the door lock of the vehicle, opening of the door of the vehicle, and the occupant getting in the vehicle is detected as the getting-in action associated with the occupant getting in the vehicle. Therefore, the occupant can see the opening animation image when the occupant gets in the vehicle.

In the above-described aspect, the display controller may display, as the opening animation image, a first animation image in which an image display operation of gradually enlarging a ring-shaped graphic object from a predetermined small size is periodically repeated, in the display region of the display panel.

According to this configuration, the first animation image in which the image display operation of gradually enlarging the ring-shaped graphic object from the predetermined small size is periodically repeated is displayed in the display region of the display panel as the opening animation image. Therefore, the beating of the heat is represented simulatively by the ring-shaped graphic object of which the size gradually increases. As a result, the occupant can feel as if the vehicle is alive.

In the above-described aspect, the display controller may periodically repeat an image display operation, in the first animation image, of displaying the graphic object in the small size, gradually enlarging the size of the graphic object, and removing the graphic object when the size of the graphic object reaches a predetermined large size.

According to this configuration, the image display operation of gradually enlarging the ring-shaped graphic object from the small size to the large size and then removing the ring-shaped graphic object is periodically repeated in the first animation image. Therefore, it is possible to more satisfactorily represent the beating of the heat simulatively.

In the above-described aspect, the display controller may display, as the opening animation image, a second animation image in which an image display operation of changing a wavy graphic object so as to spread in a horizontal direction is periodically repeated, in the display region of the display panel.

According to this configuration, the second animation image in which the image display operation of changing the wavy graphic object so as to spread in the horizontal direction is periodically repeated is displayed in the display region of the display panel as the opening animation image. Therefore, it is possible to show a dynamic animation image to the occupant.

In the above-described aspect, the vehicular display device may further include: a ring-shaped member which has a predetermined diameter and is disposed at a position corresponding to the display region of the display panel, wherein the display controller may periodically repeat an image display operation, in the second animation image, of displaying a pair of left and right wavy objects in a region corresponding to an inner side of the ring-shaped member as the wavy graphic object, and moving the pair of left and right wavy objects toward a left outside and a right outside, respectively, so that the pair of left and right wavy objects is displayed in a region extending from the region corresponding to the inner side of the ring-shaped member to a region corresponding to the outsides.

According to this configuration, the image display operation of displaying the pair of left and right wavy objects in the region corresponding to the inner side of the ring-shaped member as the wavy graphic object, and moving the pair of left and right wavy objects toward the left outside and the right outside, respectively, so that the pair of left and right wavy objects is displayed in the region extending from the region corresponding to the inner side of the ring-shaped member to the region corresponding to the outsides is periodically repeated in the second animation image. In this way, the display of the pair of left and right wavy objects starts from the region corresponding to the inner side of the ring-shaped member which is disposed at the position corresponding to the display region of the display panel. Therefore, it is possible to attract the attention of the occupant toward the display region in which the vehicle state is displayed after the driving source is started.

In the above-described aspect, the detector may include a door sensor that detects opening and closing of the door of the vehicle as a sensor that detects the getting-in action, the display controller may display a vehicle exterior image illustrating an exterior view of the vehicle in the display region of the display panel when the getting-in action is detected by the detector, and the display controller may display the vehicle exterior image with the door opened when the opening of the door of the vehicle is detected by the door sensor, display the vehicle exterior image with the door closed when the closing of the door of the vehicle is detected by the door sensor, and then remove the vehicle exterior image.

According to this configuration, when the getting-in action associated with the occupant getting in the vehicle is detected by the detector, the vehicle exterior image illustrating the exterior view of the vehicle is displayed in the display region of the display panel. Moreover, when the opening of the door of the vehicle is detected by the door sensor, the vehicle exterior image with the door opened is displayed in the display region of the display panel. Moreover, when the closing of the door of the vehicle is detected by the door sensor, the vehicle exterior image with the door closed is displayed in the display region of the display panel, and then, the vehicle exterior image is removed.

As described above, the vehicle exterior image illustrating the exterior view of the vehicle is displayed as an indicator indicating opening and closing of the door rather than displaying a simple symbol mark. In this way, the occupant can recognize the open-close state of the door more easily. Moreover, it is possible to attract the eyes of the occupant toward the predetermined display region of the display panel. As a result, the occupant can better understand the vehicle state, which is displayed after the driving source is started and is displayed in the predetermined display region of the display panel.

In the above-described aspect, the vehicular display device may further include an image memory in which an image illustrating the exterior view of the vehicle is stored in advance, and the display controller may display the image illustrating the exterior view of the vehicle as the vehicle exterior image.

According to this configuration, the image illustrating the exterior view of the vehicle in which the occupant is getting is displayed as the vehicle exterior image. Therefore, it is possible to enhance the occupant's affection for the vehicle in addition to cause the occupant to recognize the open-close state of the door. Moreover, it is possible to enhance elation that the occupant starts driving from now on. Particularly, when the vehicle is unique and has a characteristic design, it is possible to enhance the driving pleasure, the possessing pleasure or the like.

In the above-described aspect, the vehicular display device may further include: an image memory in which a plurality of vehicle exterior images including a vehicle exterior image illustrating an exterior view of the vehicle and a vehicle exterior image illustrating an exterior view of a vehicle other than this vehicle are stored in advance; and a selector that selects one vehicle exterior image from the plurality of vehicle exterior images stored in the image memory according to an operation of the occupant, wherein the display controller may display, as the vehicle exterior image, the vehicle exterior image selected by the selector.

According to this configuration, the vehicle exterior image selected by the occupant is displayed as the vehicle exterior image. Therefore, by using the selector to select a vehicle that the occupant can hardly purchase even if the vehicle is a favorite vehicle because the vehicle is an old-model vehicle, the occupant can display the selected vehicle exterior image on the display panel. As a result, the occupant can enjoyably watch the selected vehicle exterior image displayed on the display panel.

In the above-described aspect, the display controller may display the vehicle exterior image with the door opened when reopening of the door of the vehicle is detected by the door sensor before the driving source is started after the vehicle exterior image is removed, display the vehicle exterior image with the door closed when the closing of the door of the vehicle is detected by the door sensor before the driving source is started, and then remove the vehicle exterior image.

According to this configuration, the vehicle exterior image with the door opened is displayed on the display panel when the door of the vehicle is opened again before the driving source is started, and the vehicle exterior image with the door closed is displayed on the display panel when the door of the vehicle is closed before the driving source is started. Therefore, even when a fellow passenger of the driver gets into the vehicle, it is possible to display the vehicle exterior image on the display panel. As a result, even when the fellow passenger gets in the vehicle, the occupant can recognize the open-close state of the door.

In the above-described aspect, the display controller may remove the vehicle exterior image when the driving source is started during displaying of the vehicle exterior image.

According to this configuration, when the driving source is started during displaying of the vehicle exterior image, the vehicle exterior image is removed. Therefore, the vehicle exterior image does not disturb the occupant when the vehicle state is displayed in the display region of the display panel.

In the above-described aspect, the display controller may preferentially display the vehicle exterior image in the display region of the display panel over the opening animation image, when displaying the vehicle exterior image.

According to this configuration, when the vehicle exterior image is displayed, the vehicle exterior image is preferentially displayed in the display region of the display panel over the opening animation image.

Therefore, by displaying the opening animation image, it is possible to attract the attention of the occupant toward the predetermined display region of the display panel from the time point at which the occupant gets in the vehicle. Therefore, when the vehicle exterior image is displayed, the attention of the occupant is already attracted toward the display region in which the vehicle exterior image is displayed. As a result, the occupant can better recognize the open-close state of the door of the vehicle.

The invention claimed is:

1. A vehicular display device mounted on a vehicle, comprising:
    a display panel that displays information relating to the vehicle;
    a display controller that displays an opening animation image in a predetermined display region of the display panel;
    a ring-shaped member which has a predetermined diameter and is disposed at a position corresponding to the display region of the display panel; and
    a detector that detects a getting-in action associated with an occupant getting in the vehicle, wherein
    the detector includes, as a sensor that detects the getting-in action, at least one of a lock sensor that detects unlocking of a door lock of the vehicle by the occupant, a door sensor that detects opening of a door of the vehicle by the occupant, and a seat sensor that detects the occupant getting in the vehicle,
    the display controller displays a checklist indicating a checking result of a state of each unit of the vehicle in the predetermined display region as the information relating to the vehicle after a driving source for traveling of the vehicle is started,
    the display controller starts a display operation of displaying the opening animation image in the display region of the display panel when the getting-in action is detected by the detector, and continues the display operation at least until the checklist is displayed,
    the display controller displays, as the opening animation image, an animation image, in which an image display operation of changing a display form of a graphic object is periodically repeated, on the display panel,
    the display controller displays, as the opening animation image, a first animation image in which an image display operation of gradually enlarging a ring-shaped graphic object from a predetermined small size is periodically repeated, and a second animation image in which an image display operation of changing a wavy graphic object so as to spread in a horizontal direction is periodically repeated, in the display region of the display panel,
    the display controller periodically repeats an image display operation, in the first animation image, of displaying the graphic object in the small size, gradually enlarging the size of the graphic object, and removing the graphic object when the size of the graphic object reaches a predetermined large size, and
    the display controller periodically repeats an image display operation, in the second animation image, of displaying a pair of left and right wavy objects in a region corresponding to an inner side of the ring-shaped member as the wavy graphic object, and moving the pair of left and right wavy objects toward a left outside and a right outside, respectively, so that the pair of left and right wavy objects is displayed in a region extending from the region corresponding to the inner side of the ring-shaped member to a region corresponding to the outsides.

2. The vehicular display device according to claim 1, wherein
    the detector includes a door sensor that detects opening and closing of the door of the vehicle as a sensor that detects the getting-in action,
    the display controller displays a vehicle exterior image illustrating an exterior view of the vehicle in the display region of the display panel when the getting-in action is detected by the detector, and
    the display controller displays the vehicle exterior image with the door opened when the opening of the door of the vehicle is detected by the door sensor, displays the vehicle exterior image with the door closed when the closing of the door of the vehicle is detected by the door sensor, and then removes the vehicle exterior image.

3. The vehicular display device according to claim 2, further comprising:
    an image memory in which an image illustrating the exterior view of the vehicle is stored in advance, wherein
    the display controller displays the image illustrating the exterior view of the vehicle as the vehicle exterior image.

4. The vehicular display device according to claim 2, further comprising:
    an image memory in which a plurality of vehicle exterior images including a vehicle exterior image illustrating an exterior view of the vehicle and a vehicle exterior image illustrating an exterior view of a vehicle other than this vehicle are stored in advance; and
    a selector that selects one vehicle exterior image from the plurality of vehicle exterior images stored in the image memory according to an operation of the occupant, wherein the display controller displays, as the vehicle exterior image, the vehicle exterior image selected by the selector.

5. The vehicular display device according to claim 2, wherein
the display controller displays the vehicle exterior image with the door opened when reopening of the door of the vehicle is detected by the door sensor before the driving source is started after the vehicle exterior image is removed, displays the vehicle exterior image with the door closed when the closing of the door of the vehicle is detected by the door sensor before the driving source is started, and then removes the vehicle exterior image.

6. The vehicular display device according to claim 5, wherein
the display controller removes the vehicle exterior image when the driving source is started during displaying of the vehicle exterior image.

7. The vehicular display device according to claim 6, wherein
the display controller preferentially displays the vehicle exterior image in the display region of the display panel over the opening animation image, when displaying the vehicle exterior image.

8. The vehicular display device according to claim 1, wherein
the detector includes a door sensor that detects opening and closing of the door of the vehicle as a sensor that detects the getting-in action,
the display controller displays a vehicle exterior image illustrating an exterior view of the vehicle in the display region of the display panel when the getting-in action is detected by the detector, and
the display controller displays the vehicle exterior image with the door opened when the opening of the door of the vehicle is detected by the door sensor, displays the vehicle exterior image with the door closed when the closing of the door of the vehicle is detected by the door sensor, and then removes the vehicle exterior image.

* * * * *